(12) United States Patent
Ac et al.

(10) Patent No.: US 9,127,483 B2
(45) Date of Patent: Sep. 8, 2015

(54) RESETTABLE DEVICES

(75) Inventors: Shivaram Ac, Bangalore (IN);
Vidyashankar R. Buravalla, Bangalore (IN); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 311 days.

(21) Appl. No.: 13/570,323

(22) Filed: Aug. 9, 2012

(65) Prior Publication Data
US 2013/0305705 A1    Nov. 21, 2013

(30) Foreign Application Priority Data
May 15, 2012  (IN) .............................. 548/KOL/2012

(51) Int. Cl.
*F03G 7/06* (2006.01)
*E05B 47/00* (2006.01)
*E05B 83/30* (2014.01)

(52) U.S. Cl.
CPC ............ *E05B 47/0009* (2013.01); *F03G 7/065* (2013.01); *E05B 83/30* (2013.01)

(58) Field of Classification Search
USPC .................................................... 60/527–529
See application file for complete search history.

(56) References Cited

U.S. PATENT DOCUMENTS

| | | | |
|---|---|---|---|
| 4,524,343 A * | 6/1985 | Morgan et al. ................. | 337/140 |
| 4,699,314 A * | 10/1987 | Faurie .......................... | 236/49.5 |
| 4,829,843 A * | 5/1989 | Suzuki ............................ | 74/470 |
| 4,836,496 A | 6/1989 | Abujudom et al. | |
| 5,071,064 A | 12/1991 | AbuJudom, II et al. | |
| 6,732,516 B2 * | 5/2004 | Butera et al. .................... | 60/527 |
| 7,182,101 B2 * | 2/2007 | Alacqua et al. ............... | 137/875 |
| 7,814,810 B2 * | 10/2010 | Mitteer ......................... | 74/473.1 |
| 8,127,543 B2 * | 3/2012 | Von Behrens et al. .......... | 60/527 |
| 2002/0189612 A1 * | 12/2002 | Rand ........................ | 128/200.23 |
| 2005/0115235 A1 * | 6/2005 | Mernoe ............................ | 60/527 |
| 2005/0184533 A1 | 8/2005 | Hebenstreit et al. | |
| 2006/0037315 A1 | 2/2006 | Zanella et al. | |
| 2008/0022674 A1 * | 1/2008 | Brown et al. ..................... | 60/527 |
| 2008/0120911 A1 * | 5/2008 | Browne et al. .................. | 49/352 |
| 2008/0307786 A1 * | 12/2008 | Hafez et al. ...................... | 60/527 |
| 2010/0221124 A1 * | 9/2010 | Ikushima et al. ............. | 417/44.2 |
| 2010/0236236 A1 * | 9/2010 | Mankame et al. .............. | 60/527 |

FOREIGN PATENT DOCUMENTS

CN    1698252 A    11/2005
JP    61190178 A    8/1986

* cited by examiner

*Primary Examiner* — Kenneth Bomberg
*Assistant Examiner* — Shafiq Mian
(74) *Attorney, Agent, or Firm* — Quinn Law Group, PLLC

(57) ABSTRACT

A device for cycling a component between a first condition and a second condition includes an element and a reset apparatus connected to and driven by the element. The element is formed from a shape memory alloy, wherein the alloy is transitionable between a martensite crystallographic phase and an austenite crystallographic phase in response to a thermal energy source. The apparatus is actuatable by the element from an initial state in which the alloy has the martensite phase and the component is in the first condition, to an actuated state in which the alloy has the austenite phase and the component is in the second condition. The apparatus is resettable from the actuated state to a reset state in which the alloy transitions from the austenite to the martensite phase while the component is in the first condition, and further resettable from the reset state to the initial state.

14 Claims, 9 Drawing Sheets

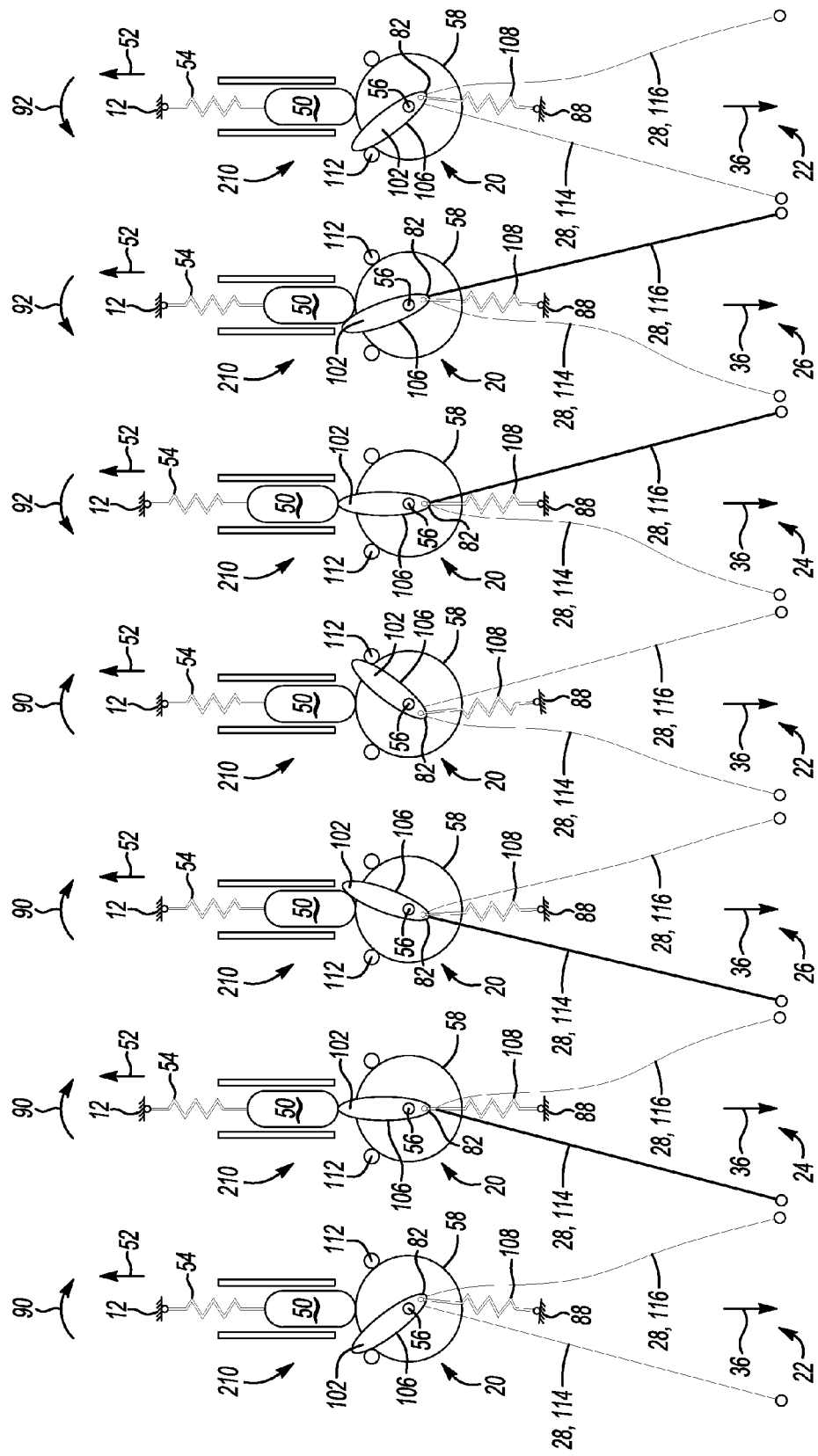

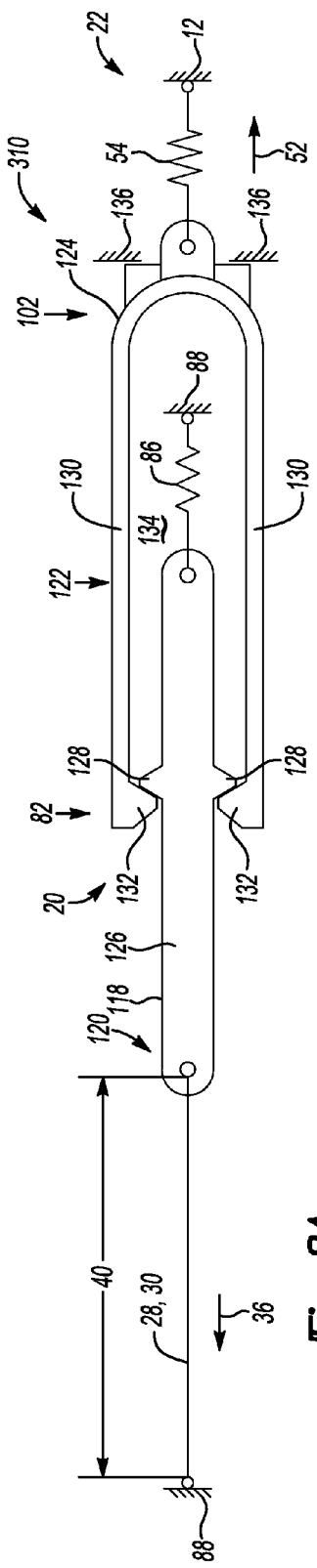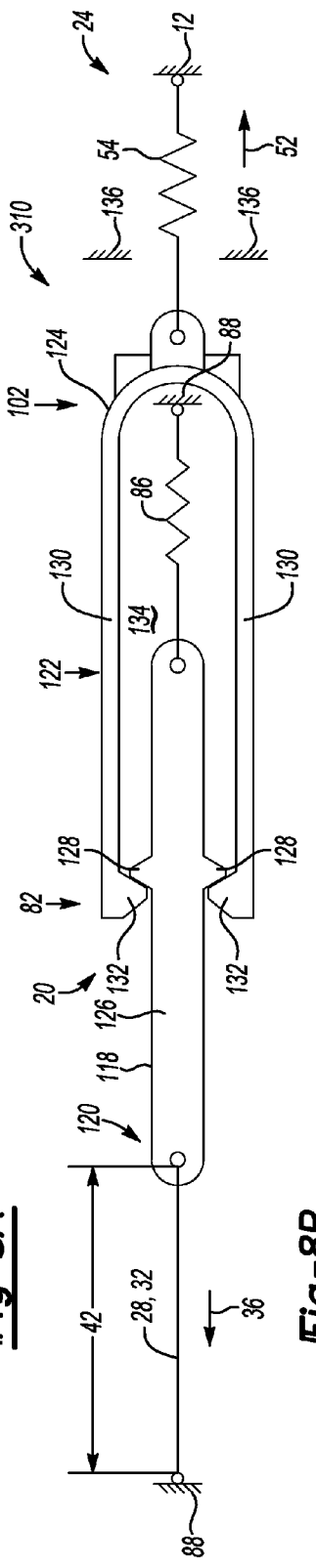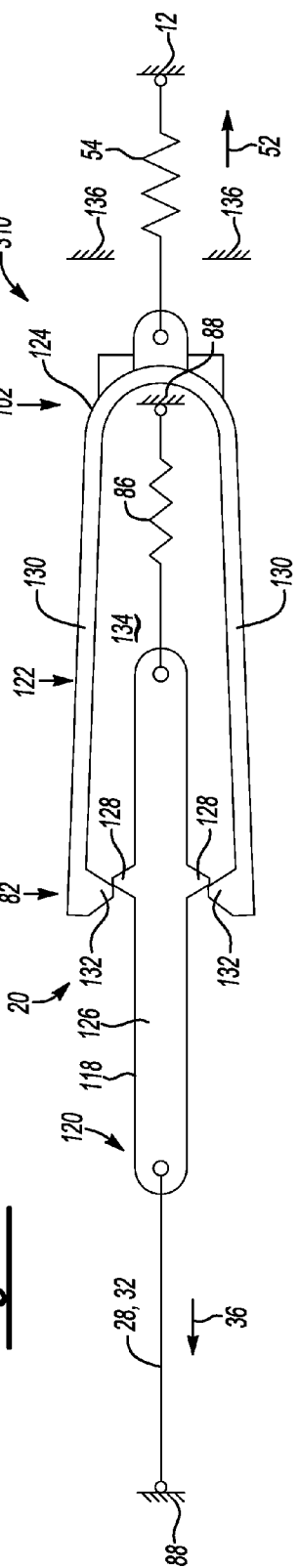

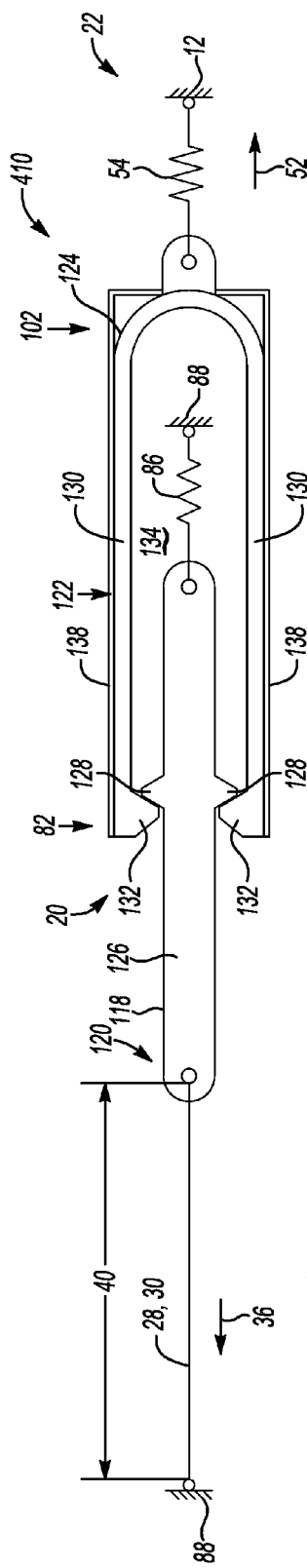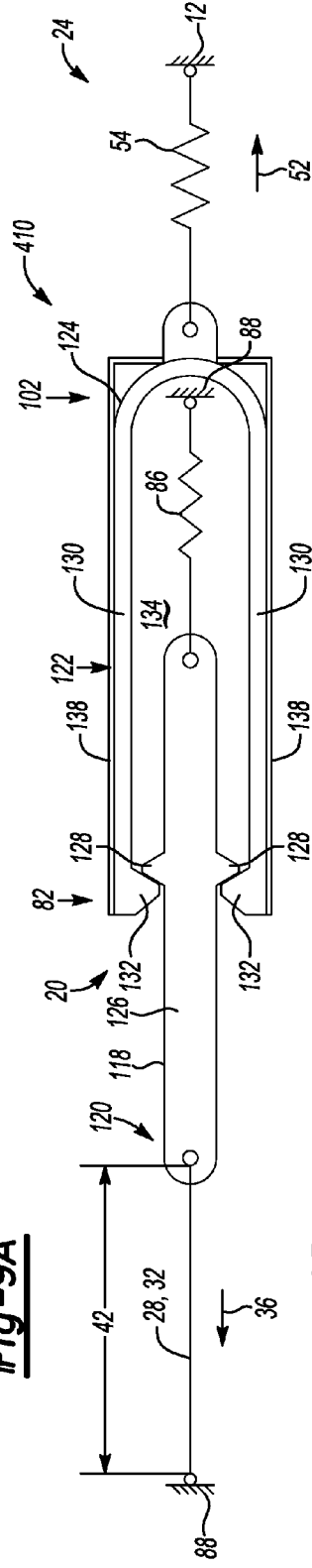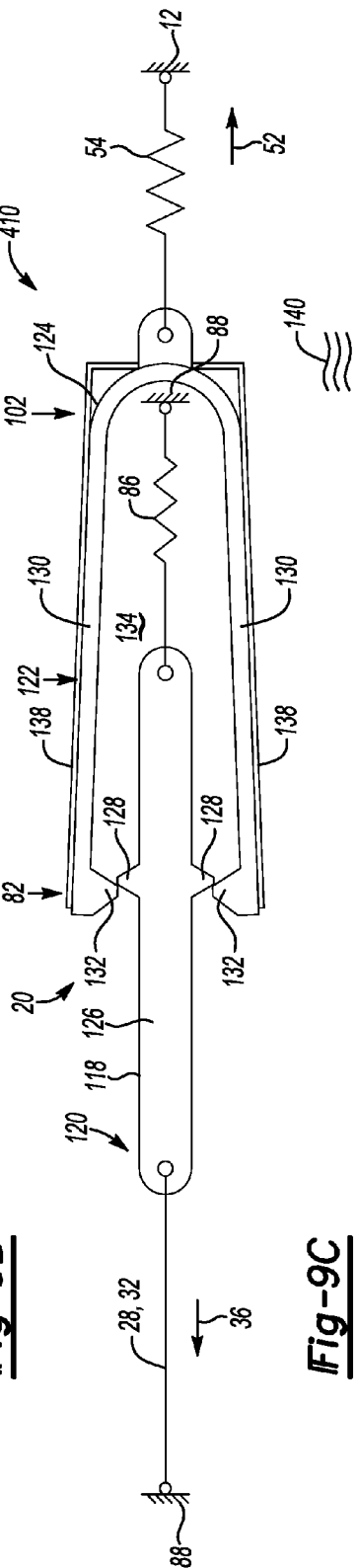

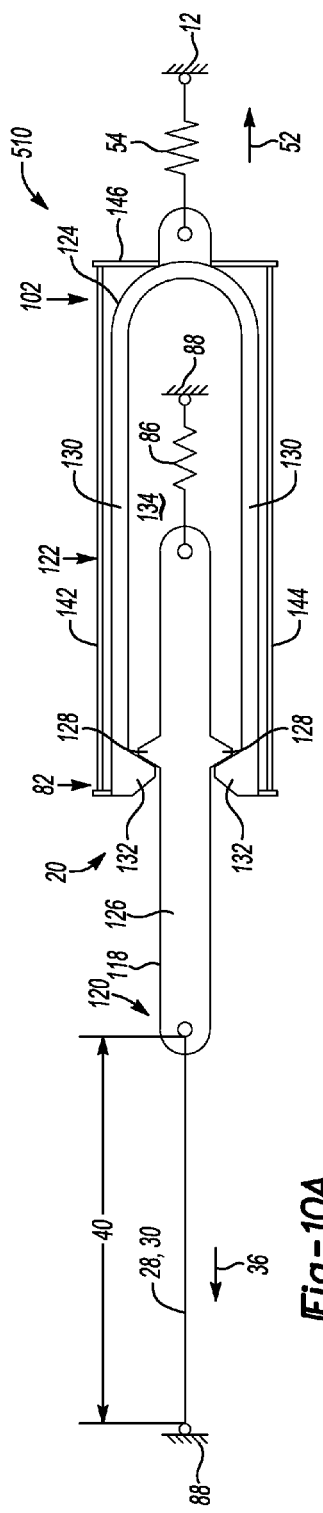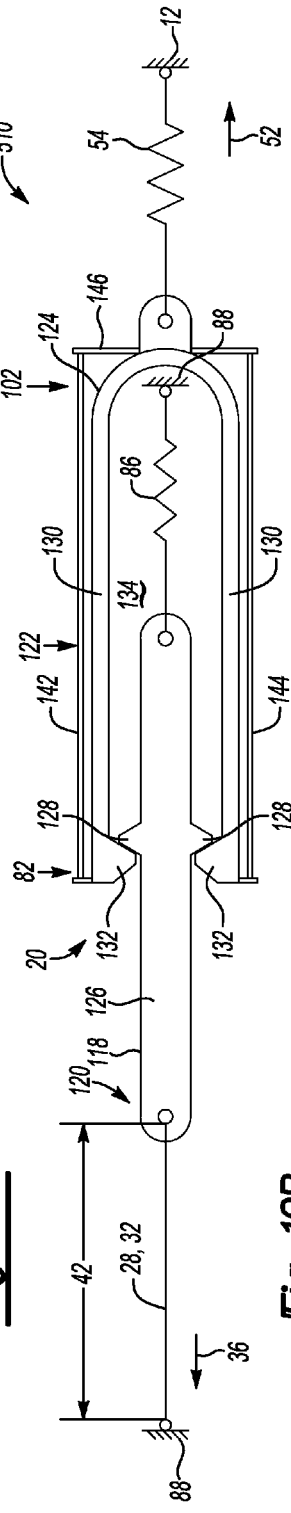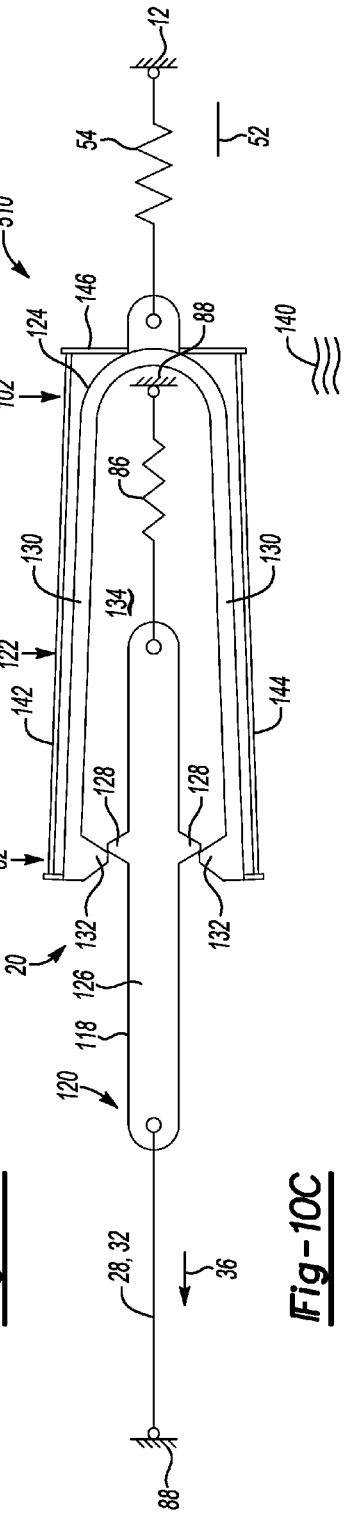

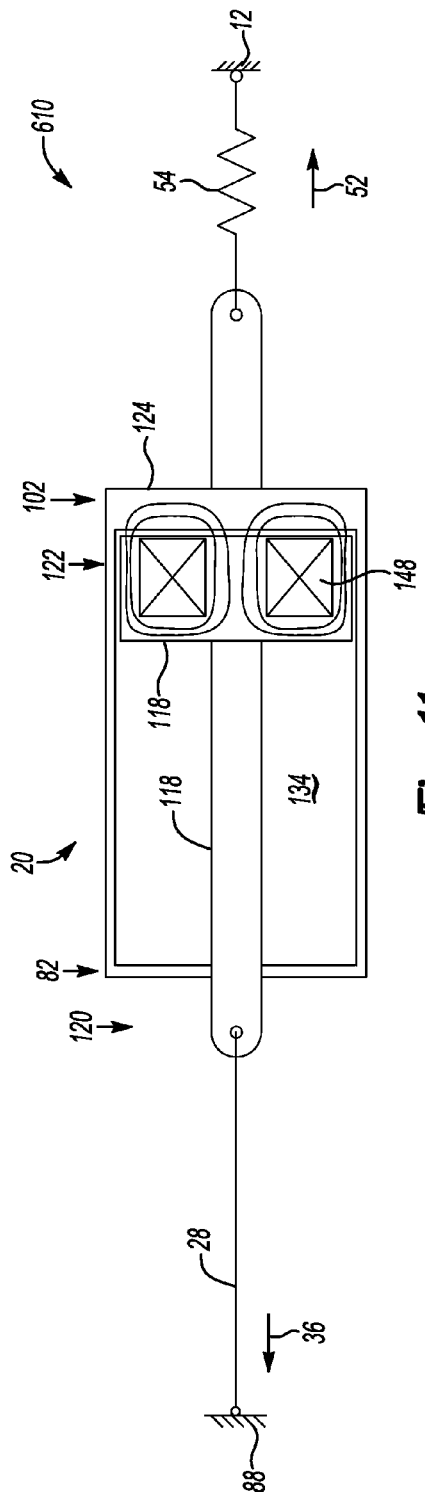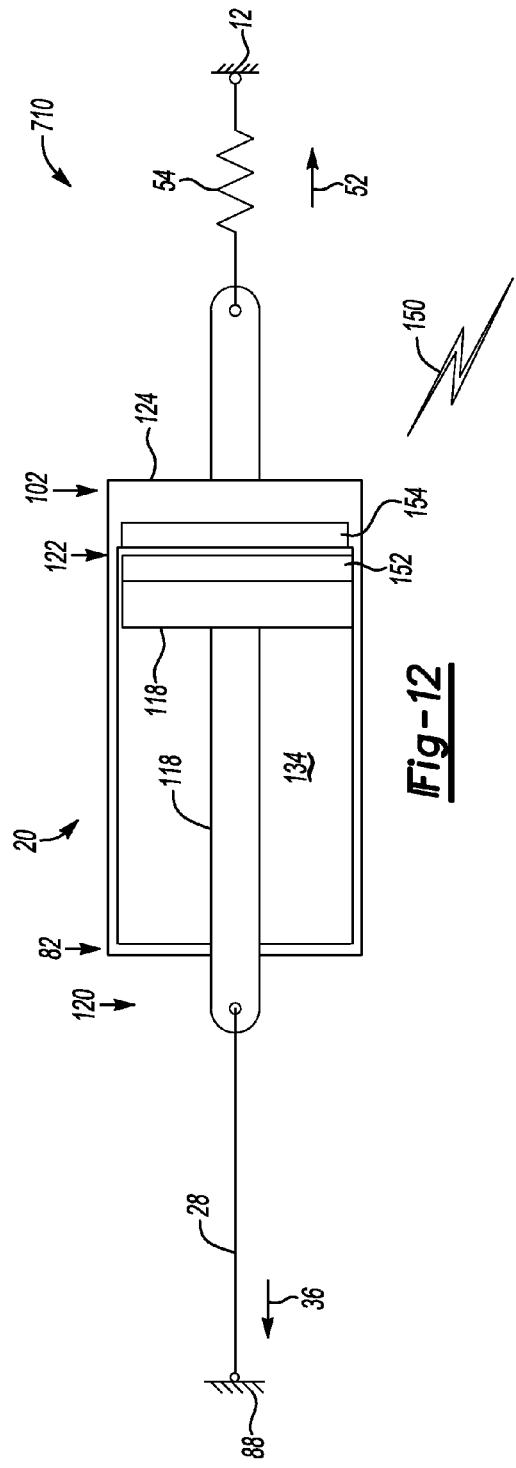

RESETTABLE DEVICES

CROSS-REFERENCE TO RELATED APPLICATIONS

This application claims the benefit of Indian Provisional Patent Application No. 548/KOL/2012, filed May 15, 2012, which is hereby incorporated by reference in its entirety.

TECHNICAL FIELD

The present disclosure generally relates to devices for cycling a component between a first condition and a second condition.

BACKGROUND

Shape memory alloys may exhibit a shape-memory effect and may quickly change stiffness, spring rate, and/or form stability. Generally, shape memory alloys undergo a solid state crystallographic phase change via molecular or crystalline rearrangement to shift between a martensite crystallographic phase and an austenite crystallographic phase. In general, the martensite crystallographic phase is a comparatively lower-temperature phase and is often more deformable than the comparatively higher-temperature austenite crystallographic phase. Therefore, devices including such shape memory alloys are often used as actuators.

SUMMARY

A device for cycling a component between a first condition and a second condition includes an element formed from a shape memory alloy, and a reset apparatus connected to and driven by the element. The shape memory alloy is transitionable between a martensite crystallographic phase and an austenite crystallographic phase in response to a source of thermal energy. The reset apparatus is actuatable by the element from an initial state in which the shape memory alloy has the martensite crystallographic phase and the component is disposed in the first condition, to an actuated state in which the shape memory alloy has the austenite crystallographic phase and the component is disposed in the second condition. In addition, the reset apparatus is resettable from the actuated state to a reset state in which the shape memory alloy transitions from the austenite crystallographic phase to the martensite crystallographic phase while the component is disposed in the first condition. The reset apparatus is further resettable from the reset state to the initial state.

In one embodiment, the element is contractable in a first direction. Further, the reset apparatus includes a link translatable in a second direction that is opposite the first direction to thereby cycle the component to the second condition. The reset apparatus also includes a disc rotatable about an axis of rotation and operatively connected to the link.

In another embodiment, the reset apparatus includes a driver component having a first end coupled to the element, and a second end spaced apart from the first end. Further, the reset apparatus includes a follower component releasably coupled to the driver component. The follower component has a proximal end and a distal end spaced apart from the proximal end.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 7A is a schematic illustration of a plan view of a third embodiment of the device of FIG. 1, wherein the device includes a first segment and a second segment, and the reset apparatus is disposed in the initial state;

FIG. 7B is a schematic illustration of a plan view of the device of FIG. 7A, wherein the first segment is heated and the reset apparatus is disposed in the actuated state;

FIG. 7C is a schematic illustration of a plan view of the device of FIG. 7A, wherein the first segment is heated and the reset apparatus is disposed in the reset state;

FIG. 7D is a schematic illustration of a plan view of the device of FIG. 7A, wherein the first segment is cooled and the reset apparatus is disposed in the initial state;

FIG. 7E is a schematic illustration of a plan view of the device of FIG. 7A, wherein the second segment is heated and the reset apparatus is disposed in the actuated state;

FIG. 7F is a schematic illustration of a plan view of the device of FIG. 7A, wherein the second segment is heated and the reset apparatus is disposed in the reset state; and FIG. 7G is a schematic illustration of a plan view of the device of FIG. 7A, wherein the second segment is cooled and the reset apparatus is disposed in the initial state;

FIG. 8A is a schematic illustration of a plan view of a fourth embodiment of the device of FIG. 1, wherein the reset apparatus is disposed in the initial state;

FIG. 8B is a schematic illustration of a plan view of the device of 8A, wherein the reset apparatus is disposed in the actuated state;

FIG. 8C is a schematic illustration of a plan view of the device of 8A before the reset apparatus is disposed in the reset state;

FIG. 9A is a schematic illustration of a plan view of a fifth embodiment of the device of FIG. 1, wherein the reset apparatus is disposed in the initial state;

FIG. 9B is a schematic illustration of a plan view of the device of 9A, wherein the reset apparatus is disposed in the actuated state;

FIG. 9C is a schematic illustration of a plan view of the device of 9A before the reset apparatus is disposed in the reset state;

FIG. 10A is a schematic illustration of a plan view of a sixth embodiment of the device of FIG. 1, wherein the reset apparatus is disposed in the initial state;

FIG. 10B is a schematic illustration of a plan view of the device of 10A, wherein the reset apparatus is disposed in the actuated state;

FIG. 10C is a schematic illustration of a plan view of the device of 10A before the reset apparatus is disposed in the reset state;

FIG. 11 is a schematic illustration of a side view of a seventh embodiment of the device of FIG. 1, wherein the device includes at least one electromagnet;

FIG. 12 is a schematic illustration of a side view of an eighth embodiment of the device of FIG. 1.

DETAILED DESCRIPTION

Figure 1:
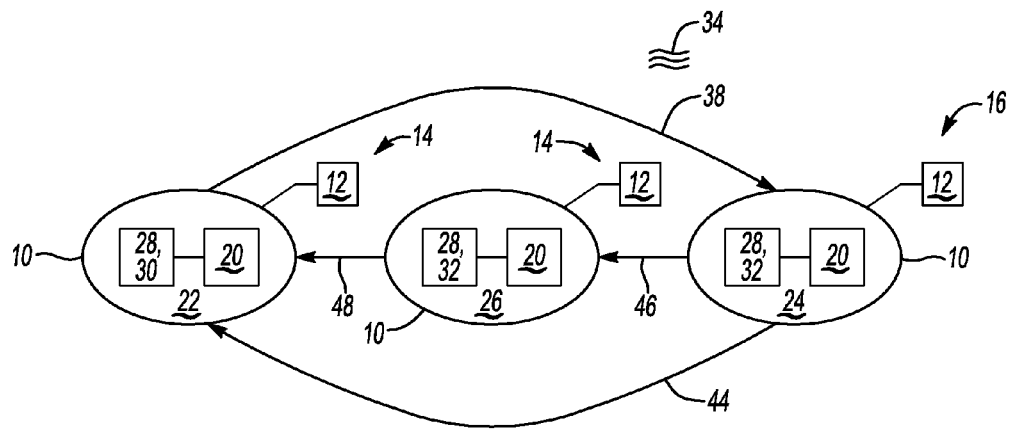
FIG. 1 is a schematic illustration of a device including an element formed from a shape memory alloy, and a reset apparatus actuatable by the element from an initial state to an actuated state.
Figure 2:
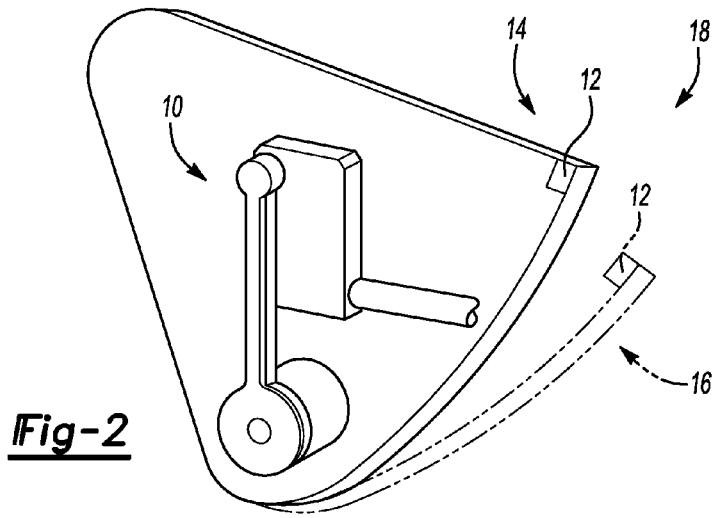
FIG. 2 is a schematic perspective fragmentary illustration of a portion of a glove box for a vehicle, wherein the glove box includes one embodiment of the device of FIG. 1, and a component cyclable between a first condition and a second condition.

Referring to the Figures, wherein like reference numerals refer to like elements, a device 10 for cycling a component 12 (FIG. 2) between a first condition 14 (FIG. 2) and a second condition 16 (FIG. 2) is shown generally at in FIG. 1. The device 10 may be useful for applications requiring actuatability and resettablilty over a short cycle time, i.e., quick actuatability and resettability. For example, as best shown in FIG. 2, the device 10 may be useful for cycling, e.g., actuating and resetting, automotive latch applications such as, but not limited to, glove box latches (shown generally at 18), decklid latches, trunk latches, hood latches, and the like. However, the device 10 may also be useful for non-latch operations, such as, for example, valve actuation, and/or non-automotive applications including aviation, residential, and marine applications.

Referring again to FIG. 1, although set forth in more detail below, the device 10 includes a reset apparatus 20 that is actuatable and resettable during the aforementioned cycling of the component 12 (FIG. 2). Therefore, as described with reference to FIG. 3, the device 10 may be useful for applications requiring actuatability from an initial state 22 to an actuated state 24. Further, the device 10 may be useful for applications requiring resettability from the actuated state 24 to a reset state 26, and from the reset state 26 to the initial state 22, to thereby cycle the component 12 between the first condition 14 (FIG. 2) and the second condition 16 (FIG. 2).

For example, as best described with reference to FIG. 1, the first condition 14 may refer to a latched condition of the component 12 and may correspond to the initial state 22 of the reset apparatus 20. Conversely, the second condition 16 may refer to an unlatched condition of the component 12 and may correspond to the actuated state 24 of the reset apparatus 20. Alternatively or additionally, the first condition 14 may refer to a closed condition of the component 12, and the second condition 16 may refer to an open condition.

With continued reference to FIG. 1, the actuated state 24 of the reset apparatus 20 may refer to an unlatched and/or open condition of the component 12. Further, as set forth in more detail below, the reset state 26 of the reset apparatus 20 may refer to a latched and/or closed condition of the component 12 wherein one or more portions of the device 10 are in a recovery mode such that the reset apparatus 20 is not yet ready for activation or actuation from the initial state 22 to the actuated state 24. In contrast, with continued reference to FIG. 1, the initial state 22 of the reset apparatus 20 may refer to a latched and/or closed condition of the component 12 wherein one or more portions of the device 10 or reset apparatus 20 are again ready for activation or actuation from the initial state 22 to the actuated state 24, as set forth in more detail below. As such, the reset apparatus 20 may be configured for resetting from the actuated state 24 to the reset state 26, and from the reset state 26 to the initial state 22, to thereby cycle the component 12 between the first condition 14 and the second condition 16, as also set forth in more detail below.

Figure 3:
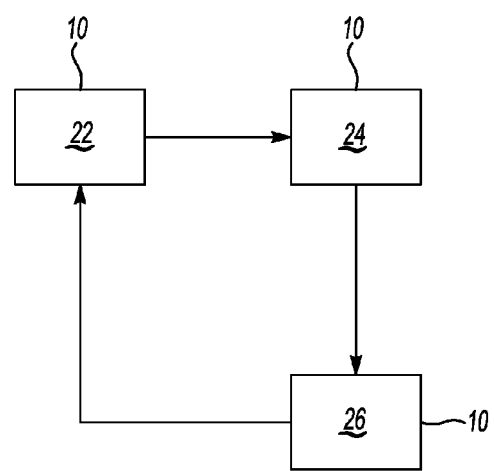
FIG. 3 is a schematic illustration of the device of FIG. 1 as the reset apparatus actuates from an initial state to an actuated state, resets from the actuated state to the reset state, and further resets from the reset state to the initial state.

Further, with continued reference to FIGS. 1 and 2, the device 10 may be passively reset or actively reset from the actuated state 24 (FIG. 3) to the reset state 26 (FIG. 3), and from the reset state 26 to the initial state 22 (FIG. 3). As used herein, the terminology "passively reset" refers to embodiments reset without electronically-actuated or electronically-controlled components, such that the reset apparatus 20 automatically resets from the actuated state 24 to the reset state 26, and from the reset state 26 to the initial state 22. Further, "passively reset" may refer to position-based devices (shown generally at 10, 110 in FIGS. 4 and 6, respectively) and/or force-based devices (shown generally at 310, 710, 810 in FIGS. 8A-8C, 12, and 13, respectively). In contrast, the terminology "actively reset" refers to embodiments resettable by one or more electronically-actuated or electronically-controlled components, such that the reset apparatus 20 is actuated or controlled and does not automatically reset from the actuated state 24 to the reset state 26, and from the reset state 26 to the initial state 22.

Referring again to FIG. 1, the device 10 includes an element 28 formed from a shape memory alloy transitionable from a martensite crystallographic phase (represented generally at 30 in FIG. 1) to an austenite crystallographic phase (represented generally at 32 in FIG. 1) in response to a source of thermal energy 34.

As used herein, the terminology "shape memory alloy" refers to alloys that exhibit a shape memory effect and have the capability to quickly change stiffness, spring rate, and/or form stability. That is, the shape memory alloy may undergo a solid state crystallographic phase change via molecular or crystalline rearrangement to shift between the martensite crystallographic phase 30 (FIG. 1), i.e., "martensite", and the austenite crystallographic phase 32 (FIG. 1), i.e., "austenite". Stated differently, the shape memory alloy may undergo a displacive transformation rather than a diffusional transformation to shift between the martensite crystallographic phase 30 and the austenite crystallographic phase 32. A displacive transformation is defined as a structural change that occurs by the coordinated movement of atoms or groups of atoms relative to neighboring atoms or groups of atoms. In general, the martensite crystallographic phase 30 refers to the comparatively lower-temperature phase and is often more deformable than the comparatively higher-temperature austenite crystallographic phase 32.

The temperature at which the shape memory alloy begins to change from the austenite crystallographic phase 32 (FIG. 1) to the martensite crystallographic phase 30 (FIG. 1) is known as the martensite start temperature, $M_s$. The temperature at which the shape memory alloy completes the change from the austenite crystallographic phase 32 to the martensite crystallographic phase 30 is known as the martensite finish temperature, $M_f$, or transformation temperature, $T_{trans}$. Similarly, as the shape memory alloy is heated, the temperature at which the shape memory alloy begins to change from the martensite crystallographic phase 30 to the austenite crystallographic phase 32 is known as the austenite start temperature, $A_s$. The temperature at which the shape memory alloy completes the change from the martensite crystallographic phase to the austenite crystallographic phase is known as the austenite finish temperature, $A_f$, or transformation temperature, $T_{trans}$.

Therefore, the element 28 (FIG. 1) formed from the shape memory alloy may be characterized by a cold state, i.e., when a temperature of the shape memory alloy is below the martensite finish temperature, $M_f$, or transformation temperature, $T_{trans}$, of the shape memory alloy. Likewise, the element 28 may also be characterized by a hot state, i.e., when the temperature of the shape memory alloy is above the austenite finish temperature, $A_f$, or transformation temperature, $T_{trans}$, of the shape memory alloy. As such, the element 28 may operate in response to the source of thermal energy 34 (FIG. 1), i.e., may dimensionally expand when cooled and may dimensionally contract when heated.

In operation, the shape memory alloy that is pre-strained or subjected to tensile stress can change dimension upon changing crystallographic phase 30, 32 (FIG. 1) to thereby convert thermal energy to mechanical energy. That is, when exposed to the source of thermal energy 34 (FIG. 1), the element 28 (FIG. 1) formed from the shape memory alloy changes dimension upon changing crystallographic phase 30, 32 to thereby convert thermal energy to mechanical energy, as set forth in more detail below.

Figure 4:
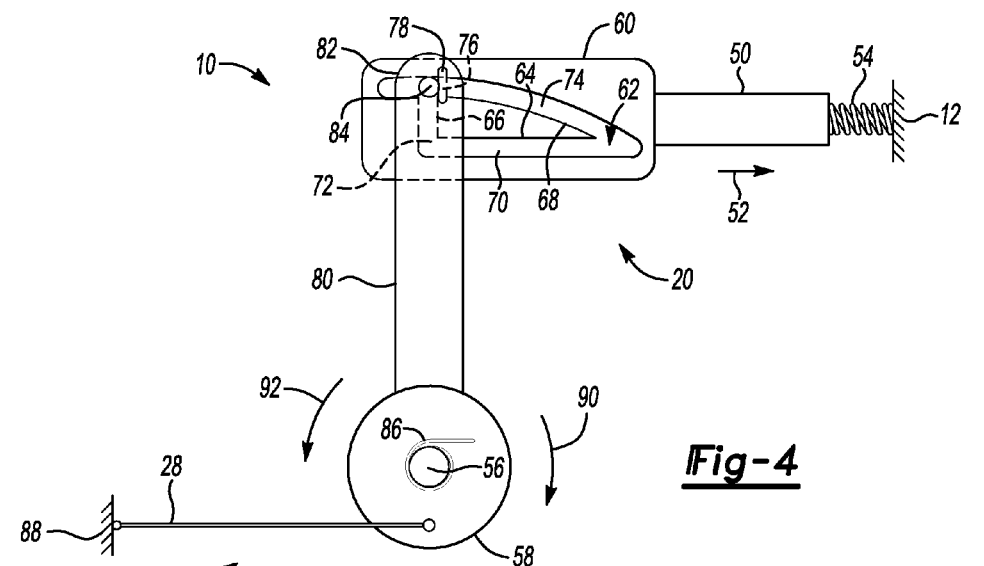
FIG. 4 is a schematic illustration of a plan view of a first embodiment of the device of FIG. 1.

In particular, changing the crystallographic phase from the martensite crystallographic phase 30 (FIG. 1) to the austenite crystallographic phase 32 (FIG. 1) may dimensionally contract the shape memory alloy in response to an increase in temperature of the shape memory alloy. For example, the element 28 may contract and/or shorten as the shape memory alloy transitions from the martensite crystallographic phase 30 to the austenite crystallographic phase 32. That is, as best shown in FIG. 4, the element 28 may be contractable in a first direction (represented generally by arrow 36).

More specifically, the shape memory alloy may dimensionally contract if the shape memory alloy has been previously pre-strained pseudoplastically. The terminology "pre-strained pseudoplastically" refers to stretching, e.g., straining, the element 28 (FIG. 1) under load while the shape memory alloy is in the martensite crystallographic phase 30 (FIG. 1). The shape of the shape memory alloy under load may not fully recover when the element 28 is unloaded. In contrast, a shape of the element 28 when strained under purely elastic strain may fully recover. Therefore, upon unloading, the element 28 formed from the shape memory alloy appears to have plastically deformed, but when the element 28 is heated to the austenite start temperature, $A_s$, the strained shape can be recovered so that the element 28 returns to an original length. That is, it is possible to load the shape memory alloy such that an elastic strain limit of the shape memory alloy is surpassed and deformation takes place in the martensitic crystallographic structure of the shape memory alloy prior to exceeding a true plastic strain limit of the shape memory alloy. Strain of this type, between the elastic strain limit and the true plastic strain limit, is pseudoplastic strain.

As such, the element 28 (FIG. 1) formed from the shape memory alloy may be stretched before installation in the device 10 (FIG. 1) such that the nominal length of the shape memory alloy includes the recoverable pseudoplastic strain. Such recoverable pseudoplastic strain may provide motion for actuating and/or driving the device 10. Therefore, without pre-stretching the shape memory alloy, little deformation may occur during crystallographic phase change. Further, the element 28 may be subjected to a tensile force provided by a biasing mechanism, e.g., a spring, or a tensioned austenitic section of the shape memory alloy, to effect crystallographic phase change.

Conversely, changing the shape memory alloy from the austenite crystallographic phase 32 (FIG. 1) to the martensite crystallographic phase 30 (FIG. 1) may dimensionally expand the shape memory alloy in response to cooling the shape memory alloy. Therefore, the element 28 (FIG. 1) may expand as the shape memory alloy transitions from the austenite crystallographic phase 32 to the martensite crystallographic phase 30. For example, the element 28 may soften, relax, and/or lengthen. That is, when the shape memory alloy is subjected to a tensile stress and a comparatively cooler temperature, the shape memory alloy may dimensionally expand. The shape memory alloy may thereby convert thermal energy to mechanical energy by alternately expanding and contracting. That is, the shape memory alloy may alternately dimensionally contract in response to an increase in temperature and dimensionally expand in response to a decrease in temperature to thereby convert thermal energy to mechanical energy.

The shape memory alloy may have any suitable composition. In particular, the shape memory alloy may include in combination an element selected from the group of cobalt, nickel, titanium, indium, manganese, iron, palladium, zinc, copper, silver, gold, cadmium, tin, silicon, platinum, and gallium. For example, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy can be binary, ternary, or any higher order so long as the shape memory alloy exhibits a shape memory effect, e.g., a change in shape orientation, damping capacity, and the like. The shape memory alloy may be selected according to desired operating temperatures of the device 10 (FIG. 1), as set forth in more detail below. In one specific example, the shape memory alloy may include nickel and titanium.

Further, the element 28 (FIG. 1) formed from the shape memory alloy may have any suitable form, i.e., shape. For example, the element 28 may have a form of a shape-changing element. That is, the element 28 may have a form selected from the group of springs, tapes, wires, bands, continuous loops, and combinations thereof. As best shown in FIG. 4, in one non-limiting embodiment, the element 28 may be configured as a wire.

With continued reference to FIG. 1, the shape memory alloy may be transitionable from the martensite crystallographic phase 30 to the austenite crystallographic phase 32 over a first duration 38. The first duration 38 may be from about 0.25 seconds to about 3 seconds, e.g., about 1 second. For example, heat (represented generally as the source of thermal energy 34 in FIG. 1) may be applied to the element 28, and the shape memory alloy may transition from the martensite crystallographic phase 30 to the austenite crystallographic phase 32. As such, the element 28 may contract and/or stiffen. Therefore, the element 28 may have a first state, property, and/or shape when the shape memory alloy has the martensite crystallographic phase 30, and may have a second state, property, and/or shape when the shape memory alloy has the austenite crystallographic phase 32. For example, the shape memory alloy may change stiffness, density, shape, tensile strength, length, width, thickness, spring rate, and combinations thereof as the shape memory alloy transitions between the martensite crystallographic phase 30 and the austenite crystallographic phase 32.

As best shown in FIGS. 8A and 8B, in one non-limiting example, the element 28 may shorten from a first length 40 (FIG. 8A) to a second length 42 (FIG. 8B) that is less than the first length 40. That is, the element 28 may have the first length 40 when the shape memory alloy has the martensite crystallographic phase 30, and the second length 42 (FIG. 8B) when the shape memory alloy has the austenite crystallographic phase 32.

With continued reference to FIG. 1, although not illustrated to scale, the shape memory alloy may be transitionable from the austenite crystallographic phase 32 to the martensite crystallographic phase 30 over a second duration 44 that is longer than the first duration 38. The second duration 44 may be from about 3.5 seconds to about 15 seconds, e.g., about 5 seconds. Therefore, the element 28 may transition from the martensite crystallographic phase 30 to the austenite crystallographic phase 32 faster than the element 28 transitions from the austenite crystallographic phase 32 to the martensite crystallographic phase 30. Stated differently, the element 28 may contract and/or stiffen faster than the element 28 expands and/or relaxes. A ratio of the first duration 38 to the second duration 44 may be from about 1:2 to about 1:20, e.g., about 1:10.

For example, referring again to FIG. 1, heat 34 may be removed from the element 28, i.e., the element 28 may be cooled, and the shape memory alloy may transition from the austenite crystallographic phase 32 to the martensite crystallographic phase 30 over the second duration 44. As such, the element 28 may expand and/or relax over the second duration 44. Therefore, the element 28 may lengthen from the second length 42 (FIG. 8B) to the first length 40 (FIG. 8A).

Referring again to FIG. 1, the device 10 also includes the reset apparatus 20 connected to and driven by the element 28. For example, the reset apparatus 20 may be directly or indirectly coupled or attached to the element 28, as set forth in more detail below. In general, the reset apparatus 20 may be configured for cycling the component 12 from the second condition 16 to the first condition 14 so that one or more portions of the device 10 may recover and/or change properties to again be ready for operation of the device 10.

More specifically, as described with reference to FIG. 1, the reset apparatus 20 is actuatable by the element 28 from the initial state 22 in which the shape memory alloy has the martensite crystallographic phase 30 and the component 12 is in the first condition 14, to the actuated state 24 in which the shape memory alloy has the austenite crystallographic phase 32 and the component 12 is in the second condition 16. For example, when the reset apparatus 20 is in the initial state 22, i.e., is ready for actuation, and the component 12 is in the first condition 14, e.g., latched and/or closed, the shape memory alloy may transition from the martensite crystallographic phase 30 to the austenite crystallographic phase 32 over the first duration 38 to actuate the reset apparatus 20 to the actuated state 24, i.e., wherein the shape memory alloy has the comparatively less deformable austenite crystallographic phase 32, and the component 12 is in the second condition 16. In one non-limiting example, the element 28 may shorten as the shape memory alloy transitions from the martensite crystallographic phase 30 to the austenite crystallographic phase 32 to thereby actuate the reset apparatus 20 from the initial state 22 to the actuated state 24. Therefore, the reset apparatus 20 is driven by the element 28, and the device 10 may, for example, unlatch a latch (not shown) and/or open a valve (not shown).

With continued reference to FIG. 1, the reset apparatus 20 is resettable from the actuated state 24 to the reset state 26 in which the shape memory alloy transitions from the austenite crystallographic phase 32 to the martensite crystallographic phase 30 while the component 12 is in the first condition 14. That is, as set forth in more detail below, the reset state 26 may allow the shape memory alloy to transition from the austenite crystallographic phase 32 to the martensite crystallographic phase 30 while the component 12 is not in the second condition 16, e.g., open or unlatched.

Therefore, referring again to FIG. 1, the reset state 26 may correspond to the first condition 14 in which the component 12 is latched or closed, and the shape memory alloy has not yet transitioned from the austenite crystallographic phase 32 to the martensite crystallographic phase 30. The source of thermal energy 34 may be removed from the element 28 in the reset state 26 of the reset apparatus 20, but the element 28 may still be contracted and/or shortened and not yet available for reactuating the reset apparatus 20 to the actuated state 24, e.g., unlatched or open. Therefore, the shape memory alloy may continue to transition to the martensite crystallographic phase 30 and thereby, for example, expand and lengthen to the first length 40 (FIG. 8A), when the reset apparatus 20 is disposed in the reset state 26.

Referring to FIG. 1, the element 28 may lengthen as the shape memory alloy transitions from the austenite crystallographic phase 32 to the martensite crystallographic phase 30 as the reset apparatus 20 resets from the actuated state 24 to the reset state 26. As such, the component 12 may be relatched or closed, i.e., may cycle from the second condition 16 to the first condition 14, while the shape memory alloy continues to transition to the comparatively more deformable martensite crystallographic phase 30. That is, the reset apparatus 20 may allow the shape memory alloy to recover to the martensite crystallographic phase 30 even while the component 12 is latched and/or closed, i.e., is in the first condition 14.

With continued reference to FIG. 1, the reset apparatus 20 is resettable from the actuated state 24 to the reset state 26 over a third duration (represented generally at 46) that is less than the second duration 44. That is, the reset apparatus 20 may reset from the actuated state 24 to the reset state 26 faster than the shape memory alloy transitions from the austenite crystallographic phase 32 to the martensite crystallographic phase 30. For non-limiting latching applications, the reset state 26 may represent a closed or latched configuration of the component 12. Therefore, the reset apparatus 20 may reset from the actuated state 24, i.e., an open or unlatched configuration of the component 12, to the reset state 26, i.e., a closed or latched configuration of the component 12, before the shape memory alloy completely transitions from the austenite crystallographic phase 32 to the martensite crystallographic phase 30. As such, the reset apparatus 20 may be disposed in the reset state 26 to allow for relatching or closing of the component 12 as the shape memory alloy cools, and as the element 28 expands, deforms, relaxes, and/or shortens. The third duration 46 may be from about 0.25 seconds to about 2 seconds, e.g., about 1 second. That is, the third duration 46 may be approximately equal to the first duration 38. Therefore, although not illustrated to scale in FIG. 1, the reset apparatus 20 may just as quickly actuate to the actuated state 24 as the reset apparatus 20 resets to the reset state 26. Stated differently, the component 12 may be quickly relatched or closed even though the shape memory alloy has not yet fully transitioned to the martensite crystallographic phase 30.

Further, referring to FIG. 1, the reset apparatus 20 may not be actuatable from the initial state 22 to the actuated state 24 when the reset apparatus 20 is in the reset state 26. Rather, the shape memory alloy may continue to transition to the martensite crystallographic phase 30 before the reset apparatus 20 is again actuatable to the actuated state 24 and/or the component 12 is again cyclable to the second condition 16. Stated differently, the device 10 may not cycle the component 12 to the second condition 16 while the reset apparatus 20 is in the reset state 26.

With continued reference to FIG. 1, the reset apparatus 20 is further resettable from the reset state 26 to the initial state 22. More specifically, the reset apparatus 20 may be further resettable from the reset state 26 to the initial state 22 over a fourth duration (represented generally at 48) that is equal to a difference between the second duration 44 and the third duration 46. That is, the fourth duration 48 may be a recovery interval for the reset apparatus 20 and may represent a length of time necessary for the shape memory alloy to finish transitioning from the austenite crystallographic phase 32 to the martensite crystallographic phase 30 so that the element 28 returns to the first length 40 (FIG. 8A). Depending upon the length of the second and third durations 44, 46, the fourth duration 48 may be from about 3.25 seconds to about 12 seconds, e.g., about 4 seconds.

Referring now to FIGS. 4, 6, and 7A-7G, in one embodiment, the device 10, 110, 210 may rotate to cycle the component 12 between the first condition 14 (FIG. 2) and the second condition 16 (FIG. 2). For this embodiment, the reset apparatus 20 includes a link 50 translatable in a second direction (represented by arrow 52) that is opposite the first direction 36 to thereby cycle the component 12 to the second condition 16. For example, the link 50 may be attached to a first resilient member 54, e.g., a spring, that may be configured to engage the component 12. As such, the link 50 may compress the first resilient member 54 to unlatch and/or open the component 12, as set forth in more detail below.

With continued reference to FIGS. 4, 6, and 7A-7G, for this embodiment, the reset apparatus 20 also includes a disc 58 rotatable about an axis of rotation (denoted generally at 56) and operatively connected to the link 50. For example, as set forth in more detail below, the element 28 may be attached to the disc 58, and may shorten in the first direction 36 as the shape memory alloy transitions from the martensite crystallographic phase 30 (FIG. 1) to the austenite crystallographic phase 32 (FIG. 1) to thereby rotate the disc 58 about the axis of rotation 56. That is, the first direction 36 may be substantially perpendicular to the axis of rotation 56.

More specifically, in a first embodiment described with reference to FIGS. 4-5F, the device 10 may have a position-based configuration and may be passively reset. For this embodiment, the device 10 may include a cam-lever mechanism.

Referring to FIG. 4, the device 10 may include a cam 60 connected to the link 50 and defining a groove 62 therein. In particular, the cam 60 may include a horizontal wall 64, a vertical wall 66, and a curvilinear wall 68 interconnecting the vertical wall 66 and the horizontal wall 64. The horizontal wall 64 may define a horizontal portion 70 of the groove 62, the vertical wall 66 may define a vertical portion 72 of the groove 62, and the curvilinear wall 68 may define a curvilinear portion 74 of the groove 62. As such, the groove 62 may have a D-shape.

With continued reference to FIG. 4, the cam 60 may be configured for translating linearly in the first direction 36 and in the second direction 52. In addition, the cam 60 may include a gate flap 76 pivotable about an axis 78 and configured for alternatingly blocking and unblocking the groove 62. The axis 78 may be substantially parallel to the axis of rotation 56. Further, the cam 60 may be coupled to the link 50, which may in turn be coupled to the first resilient member 54. As set forth above, the first resilient member 54 may be configured to act upon the component (represented generally by 12). For example, the component 12 may be a latch or a portion of a valve, and the first resilient member 54 may be configured to unlatch or open the component 12.

Referring again to FIG. 4, for this embodiment, the device 10 may further include an arm 80 extending from the disc 58 and having a distal end 82, wherein the arm 80 includes a pin 84 protruding from the distal end 82 and configured for translating within the groove 62. The pin 84 may be spaced apart from the disc 58 and may be matable with the groove, e.g., may be positionable within the groove 62. Further, the device 10 may include a second resilient member 86, e.g., a clock spring, disposed adjacent to the disc 58 along the axis of rotation 56. The second resilient member 86 may bias the disc 58 and arm 80 to an initial position.

Figure 5A:
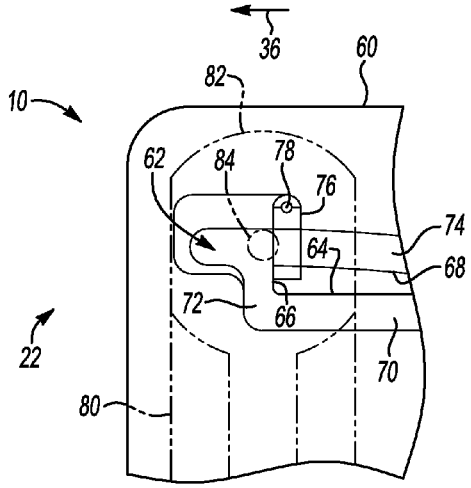
FIG. 5A is a schematic fragmentary illustration of a first position of the device of FIG. 4.
Figure 5B:
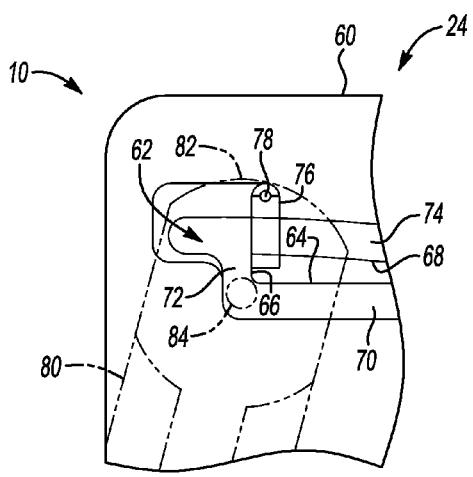
FIG. 5B is a schematic fragmentary illustration of a second position of the device of FIG. 4.
Figure 5C:
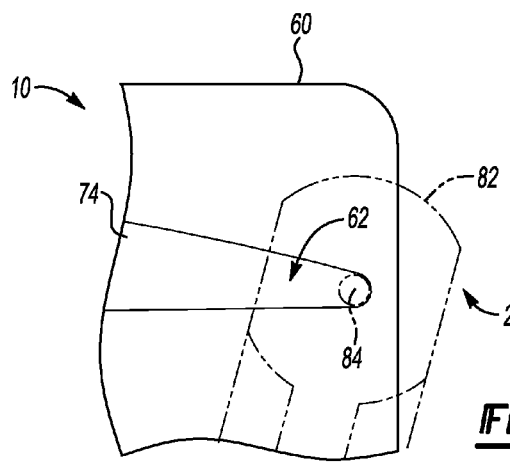
FIG. 5C is a schematic fragmentary illustration of a third position of the device of FIG. 4.
Figure 5D:
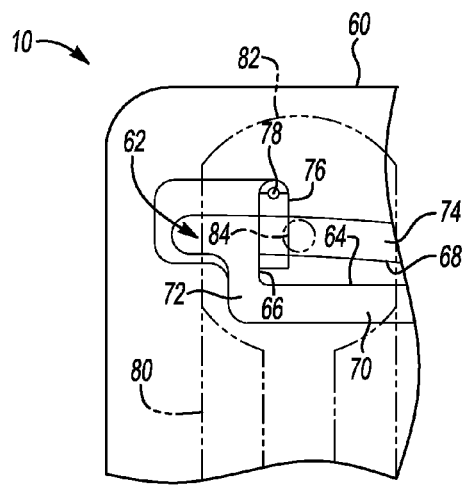
FIG. 5D is a schematic fragmentary illustration of a fourth position of the device of FIG. 4.
Figure 5E:
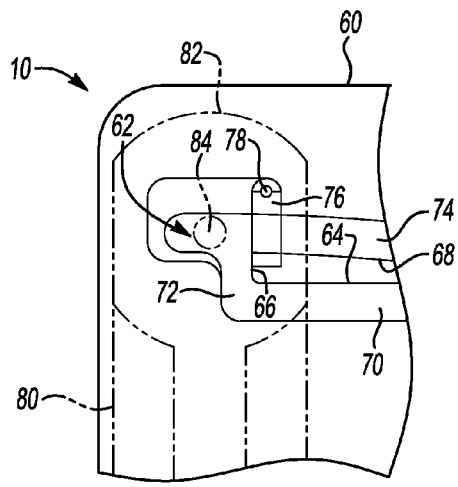
FIG. 5E is a schematic fragmentary illustration of a fifth position of the device of FIG. 4.
Figure 5F:
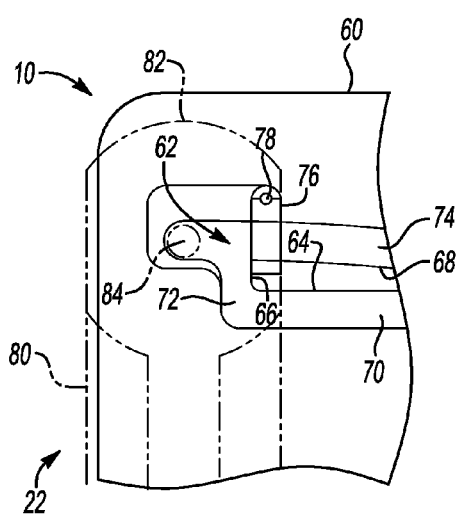
FIG. 5F is a schematic fragmentary illustration of a sixth position of the device of FIG. 4.

In addition, referring to FIGS. 4-5F, the device 10 may include the element 28 coupled to the disc 58. Further, the element 28 may be fixedly attached to an immovable object or portion (represented generally by 88) of the device 10, e.g., a wall. In operation, as the element 28 is heated, the shape memory alloy may transition from the martensite crystallographic phase 30 (FIG. 1) to the austenite crystallographic phase 32 (FIG. 1) over the first duration 38 (FIG. 1) such that the element 28 contracts, e.g., shortens from the first length 40 (FIG. 8A) to the second length 42 (FIG. 8B), in the first direction 36. Such contraction of the element 28 may rotate the disc 58 and arm 80, e.g., in a first rotational direction 90 or clockwise, so that the pin 84 pushes against the gate flap 76 and the vertical wall 66 of the cam 60. As the pin 84 pushes against the gate flap 76 and the vertical wall 66, the cam 60 and the link 50 may translate linearly in the second direction 52 and may compress the first resilient member 54. As the first resilient member 54 is compressed, the reset apparatus 20 may actuate from the initial state 22 (FIG. 5A) to the actuated state 24 (FIG. 5B). That is, the cam 60 and the link 50 may translate in the second direction 52 as the pin 84 abuts the vertical wall 66 to thereby actuate the reset apparatus 20 from the initial state 22 to the actuated state 24, and thereby cycle the component 12 to the second condition 16 (FIG. 1).

Referring now to FIG. 5B, as the element 28 (FIG. 4) continues to contract and/or shorten, the pin 84 may travel along the vertical wall 66 of the cam 60. As the pin 84 reaches the horizontal wall 64 of the cam 60, the pin 84 may continue to travel within the groove 62, and the first resilient member 54 (FIG. 4), which is disposed in a compressed state, may act upon the cam 60 such that the cam 60 rapidly translates in the first direction 36 (FIG. 4) to thereby reset the reset apparatus 20 (FIG. 4) from the actuated state 24 (FIG. 5B) to the reset state 26 (FIG. 5C) over the third duration 46 (FIG. 1). That is, the cam 60 and the link 50 may translate in the first direction 36 as the pin 84 abuts the horizontal wall 64 to thereby reset the reset apparatus 20 from the actuated state 24 to the reset state 26, and thereby cycle the component 12 (FIG. 1) to the first condition 14 (FIG. 1). The first resilient member 54 may reset the reset apparatus 20 to the reset state 26 more quickly than the shape memory alloy transitions to the martensite crystallographic phase 30 upon cooling. That is, the third duration 46 (FIG. 1) may be less than the second duration 44 (FIG. 1), as set forth above.

Referring now to FIG. 4, as the shape memory alloy continues to transition to the martensite crystallographic phase 30 (FIG. 1), the second resilient member 86 and the expanding element 28 may continue to rotate the disc 58, e.g., in a second rotational direction 92 or counterclockwise, such that the pin 84 may translate within the groove 62 along the curvilinear wall 68 of the cam 60. As best shown in FIGS. 5D and 5E, as the pin 84 contacts the gate flap 76, the gate flap 76 may pivot on the axis 78 to unblock the groove 62 and thereby reset the reset apparatus 20 from the reset state 26 (FIG. 5C) to the initial state 22 (FIGS. 5A and 5F) over the fourth duration 48 (FIG. 1). That is, the cam 60 and the link 50 may translate in the first direction 36 as the pin 84 abuts the curvilinear wall 68 to thereby reset the reset apparatus 20 from the reset state 26 to the initial state 22. As such, the device 10 may then be ready for a subsequent actuation or activation cycle.

Figure 6:
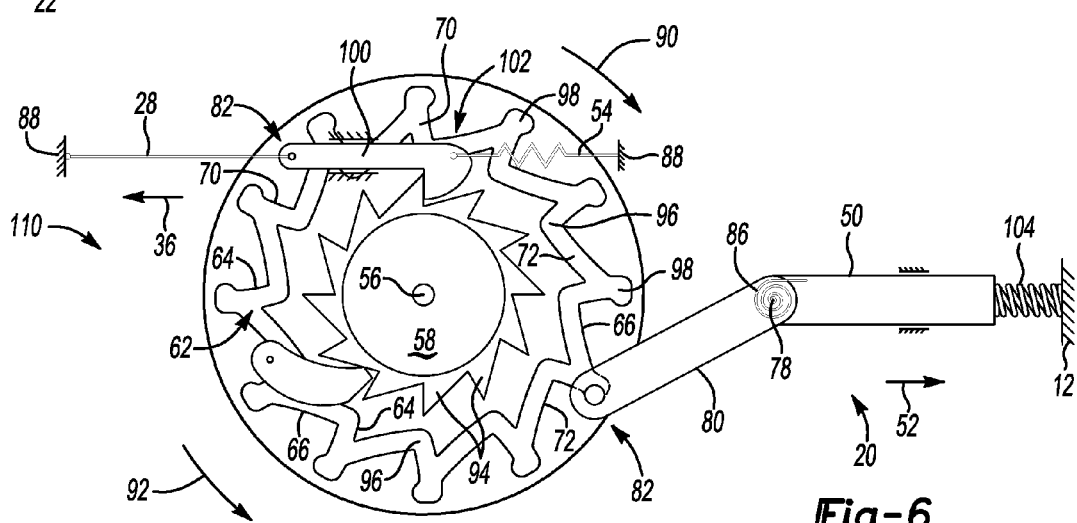
FIG. 6 is a schematic illustration of a plan view of a second embodiment of the device of FIG. 1.

Referring now to FIG. 6, in a second embodiment, the device 110 may have a position-based configuration and may be passively reset. For this embodiment, the device 110 may include a cam-pawl-ratchet mechanism.

Referring again to FIG. 6, for this embodiment, the disc 58 may include a plurality of projections 94 extending therefrom. Further, the cam 60 may be annular, may be coupled to the disc 58, and may be rotatable about the axis of rotation 56, e.g., in the first rotational direction 90. That is, the cam 60 may be concentric with the disc 58 along the axis of rotation 56.

In addition, with continued reference to FIG. 6, the cam 60 may include a plurality of horizontal walls 64 defining a plurality of horizontal portions 70 of the groove 62, and a plurality of vertical walls 66 defining a plurality of vertical portions 72 of the groove 62. Further, the plurality of vertical portions 72 and the plurality of horizontal portions 70 may define a plurality of apexes 96 and a plurality of vertices 98 therebetween, such that each of the plurality of vertices 98 is disposed between two of the plurality of apexes 96. That is, the groove 62 may have a scalloped or L-shaped pattern having the plurality of vertices 98 spaced opposite the plurality of apexes 96 as shown generally in FIG. 6.

Further, referring again to FIG. 6, the cam 60 may include a driving pawl 100 coupled to the element 28 and configured for sequentially contacting each of the plurality of projections 94 to thereby rotate the disc 58 and the cam 60 in the second rotational direction 92, e.g., counterclockwise. The driving pawl 100 may have a distal end 82 and a proximal end 102. The distal end 82 may be coupled to the element 28, and the proximal end 102 may be coupled to a first resilient member 54, e.g., a spring, attached to an immovable object or portion 88 of the device 110. In general, the driving pawl 100 may be configured for mating with each of the plurality of projections 94 as the cam 60 and the disc 58 rotate about the axis of rotation 56.

Referring again to FIG. 6, for this embodiment, the device 110 may further include a connecting arm 80 having a distal end 82, wherein the connecting arm 80 is pivotably connected to the link 50. That is, the connecting arm 80 may be pivotably connected to the link 50 such that the connecting arm 80 is rotatable about an axis 78 that is substantially parallel to the axis of rotation 56. The device 110 may also include a second resilient member 86, e.g., a clock spring, disposed along the axis 78 and configured for biasing the connecting arm 80 and the link 50. Further, the connecting arm 80 may include a pin 84 extending from the distal end 82 and configured for translating within the groove 62. That is, the pin 84 may be matable with the groove 62 and may extend from the connecting arm 80. Further, as shown in FIG. 6, the link 50 may be coupled to a third resilient member 104, e.g., a spring, and the third resilient member 104 may be configured to act upon the component 12.

With continued reference to FIG. 6, the element 28 may be fixedly attached to an immovable object or portion 88 of the device 110 (FIG. 2), e.g., a wall. As such, in operation, as the element 28 is heated, the shape memory alloy may transition from the martensite crystallographic phase 30 (FIG. 1) to the austenite crystallographic phase 32 (FIG. 1) over the first duration 38 (FIG. 1) such that the element 28 contracts, e.g., shortens from the first length 40 (FIG. 8A) to the second length 42 (FIG. 8B), in a first direction 36. Such contraction of the element 28 may linearly translate the driving pawl 100 in the first direction 36 and may elongate the first resilient member 54, which may in turn engage at least one of the plurality of projections 94 to thereby rotate the cam 60 and disc 58, e.g., in the second rotational direction 92. That is, the element 28 may shorten in the first direction 36 as the shape memory alloy transitions from the martensite crystallographic phase 30 to the austenite crystallographic phase 32 to thereby rotate the disc 58 and the cam 60 about the axis of rotation 56 in the first rotational direction 90.

Referring to FIG. 6, such rotation of the disc 58 and cam 60 may pivot the connecting arm 80 about the axis 78, and may unseat the pin 84 from a respective one of the plurality of vertices 98 so that the pin 84 translates along a respective one of the plurality of horizontal walls 64 to a corresponding one of the plurality of apexes 96. As the pin 84 then abuts a respective one of the plurality of vertical walls 66, and the connecting arm 80 continues to translate in the first direction 36, the connecting arm 80 may in turn push against the link 50 in the second direction 52. Concurrently, the sliding link 50 may compress the first resilient member 54.

Referring again to FIG. 6, as the first resilient member 54 is compressed, the reset apparatus 20 may actuate from the initial state 22 (FIG. 3) to the actuated state 24 (FIG. 3). For example, the link 50 may translate in the second direction 52 when the pin 84 is disposed in a respective one of the plurality of vertices 98 to thereby actuate the reset apparatus 20 from the initial state 22 to the actuated state 24, and thereby cycle the component 12 to the second condition 16. That is, the combined transition of the shape memory alloy to the austenite crystallographic phase 32, rotation of the cam 60 and disc 58, and translation of the connecting arm 80 and link 50 may compress the first resilient member 54 and may thereby unlatch the component 12.

Referring again to FIG. 6, as the element 28 continues to contract and/or shorten, the pin 84 may travel along the respective one of the plurality of vertical walls 66 of the cam 60 within the groove 62. As the pin 84 reaches the vertical wall 66, the pin 84 may continue to travel within the groove 62, and the first resilient member 54, which is disposed in a compressed state, may act upon the link 50 such that the link 50 rapidly translates in the first direction 36. As such, the connecting arm 80 and pin 84 may slide along the vertical wall 66 until the pin 84 again rests within the next sequential vertex 98 along the circumference of the cam 60 to thereby reset the reset apparatus 20 from the actuated state 24 (FIG. 3) to the reset state 26 (FIG. 3) over the third duration 46 (FIG. 1). That is, the link 50 may translate in the first direction 36 as the pin 84 unseats from the respective one of the plurality of vertices 98, abuts the horizontal wall 64, and seats in a respective one of the plurality of apexes 96 to thereby reset the reset apparatus 20 from the actuated state 24 to the reset state 26, and thereby cycle the component 12 to the first condition 14. As such, the first resilient member 54 may reset the reset apparatus 20 to the reset state 26 more quickly than the shape memory alloy transitions to the martensite crystallographic phase 30 upon cooling. That is, the third duration 46 (FIG. 1) may be less than the second duration 44 (FIG. 1), as set forth above.

With continued reference to FIG. 6, as the shape memory alloy continues to transition to the martensite crystallographic phase 30 (FIG. 1), the first resilient member 54 may pull the driving pawl 100 and element 28 in the second direction 52 and may thereby reset the reset apparatus 20 from the reset state 26 (FIG. 3) to the initial state 22 (FIG. 3) over the fourth duration 48 (FIG. 1). That is, the pin 84 may translate along a respective one of the plurality of vertical walls 66 to thereby reset the reset apparatus 20 from the reset state 26 to the initial state 22. As such, the device 10 may be ready for a subsequent actuation or activation cycle.

Referring now to FIGS. 7A-7G, in a third embodiment, the device 210 may have a control-based configuration and may be actively reset. For this embodiment, the device 210 may further include a lobe 106 configured for contacting the link 50 to thereby cycle the component 12 to the second condition 16 (FIG. 2). The lobe 106 may be rotatable about the axis of rotation 56 and may have a proximal end 102 and a distal end 82 spaced opposite the proximal end 102. The lobe 106 may be attached to or formed from the disc 58, disposed concentric with the disc 58, and extend beyond a periphery of the disc 58. In addition, the device 210 may further include an over-center compression spring 108 configured for biasing the lobe 106 with respect to the disc 58. Further, the device 210 may also include one or more stops 112 disposed apart from one another along the periphery of the disc 58.

As shown in FIGS. 7A-7G, the reset apparatus 20 includes the link 50, which may be coupled to a first resilient member 54, e.g., a spring. The first resilient member 54 may be configured to act upon the component (represented generally by 12).

In addition, as shown generally in FIGS. 7A-7G, the element 28 may include a first segment 114 and a second segment 116 each connected to the distal end 82 of the lobe 106 and formed from the shape memory alloy. In operation, upon heating and cooling of the first and second segments 114, 116, the disc 58 and lobe 106 may pivot about the axis of rotation 56 so that the lobe 106 contacts the link 50, and causes the link 50 to linearly translate toward and compress the first resilient member 54.

With reference to FIGS. 7A and 7B, in operation, heat 34 (FIG. 1) may be supplied to the first segment 114 according to a control signal or scheme (not shown). As the first segment 114 is heated, the shape memory alloy may transition from the martensite crystallographic phase 30 (FIG. 1) to the austenite crystallographic phase 32 (FIG. 1) over the first duration 38 (FIG. 1) such that the first segment 114 contracts, e.g., shortens. Such contraction of the first segment 114 may pull the lobe 106 in a first rotational direction 90, e.g., clockwise about the axis of rotation 56, so that the lobe 106 contacts the link 50.

Referring to FIG. 7B, as the lobe 106 contacts the link 50, the link 50 may linearly translate and compress the first resilient member 54, and may actuate the reset apparatus 20 from the initial state 22 (FIG. 7A) to the actuated state 24 (FIG. 7B). That is, the first segment 114 may shorten as the shape memory alloy transitions from the martensite crystallographic phase 30 to the austenite crystallographic phase 32 to thereby rotate the disc 58 and the lobe 106 about the axis of rotation 56 in the first rotational direction 90. The lobe 106 may contact the link 50 so that the link 50 translates away from the disc 58 to thereby actuate the reset apparatus 20 from the initial state 22 to the actuated state 24, and thereby cycle the component 12 to the second condition 16. That is, the combined transition of the shape memory alloy to the austenite crystallographic phase 32 (FIG. 1), and translation of the lobe 106 and link 50 may shorten the first resilient member 54 and may thereby unlatch the component 12.

Referring now to FIG. 7C, as the first segment 114 continues to contract and/or shorten in the first direction 36, the lobe 106 may continue to rotate, e.g., in the first rotational direction 90, and allow the link 50 to linearly translate away from the component 12 so as to elongate the first resilient member 54 to thereby reset the reset apparatus 20 from the actuated state 24 to the reset state 26 over the third duration 46 (FIG. 1). That is, the link 50 may translate towards the disc 58 to thereby reset the reset apparatus 20 from the actuated state 24 to the reset state 26, and thereby cycle the component 12 to the first condition 14. Therefore, the shape memory alloy may continue to transition to the martensite crystallographic phase 30 and thereby, for example, expand and lengthen the first segment 114 when the reset apparatus 20 is disposed in the reset state 26. Stated differently, the first resilient member 54 may reset the reset apparatus 20 to the reset state 26 more quickly than the shape memory alloy transitions to the martensite crystallographic phase 30 upon cooling. That is, the third duration 46 (FIG. 1) may be less than the second duration 44 (FIG. 1), as set forth above.

Referring now to FIG. 7D, as the first segment 114 is cooled and the shape memory alloy continues to transition to the martensite crystallographic phase 30 (FIG. 1), the lobe 106 may abut one of the stops 112 as the first segment 114 continues to expand and/or lengthen, and may thereby reset the reset apparatus 20 from the reset state 26 to the initial state 22 over the fourth duration 48 (FIG. 1). That is, the device 210 may then be ready for a subsequent actuation or activation cycle.

Next, as described with reference to FIGS. 7D-7F, in continued operation, heat 34 (FIG. 1) may be supplied to a second segment 116 (FIG. 7E) according to a control signal or scheme (not shown). As the second segment 116 is heated, the shape memory alloy may transition from the martensite crystallographic phase 30 (FIG. 1) to the austenite crystallographic phase 32 (FIG. 1) over the first duration 38 (FIG. 1) such that the second segment 116 contracts, e.g., shortens. Such contraction of the second segment 116 may pull the lobe 106 in a second rotational direction 92, e.g., counterclockwise about the axis of rotation 56, that is opposite the first rotational direction 90, so that the lobe 106 contacts the link 50. That is, the second segment 116 may shorten as the shape memory alloy transitions from the martensite crystallographic phase 30 to the austenite crystallographic phase 32 to thereby rotate the disc 58 and the lobe 106 about the axis of rotation 56 in the second rotational direction 92.

Referring to FIG. 7E, as the lobe 106 contacts the link 50, the link 50 may linearly translate and compress the second resilient member 86 and actuate the reset apparatus 20 from the initial state 22 (FIG. 7D) to the actuated state 24 (FIG. 7E). That is, the combined transition of the shape memory alloy to the austenite crystallographic phase 32 (FIG. 1), and translation of the lobe 106 and link 50 may shorten the first resilient member 54 and may thereby unlatch the component 12.

Referring now to FIG. 7F, as the second segment 116 continues to contract and/or shorten in the second direction 52, the lobe 106 may continue to rotate in the second rotational direction 92 and allow the link 50 to linearly translate away from the component 12 so as to elongate the first resilient member 54 to thereby reset the reset apparatus 20 from the actuated state 24 to the reset state 26 over the third duration 46 (FIG. 1). Therefore, the shape memory alloy may continue to transition to the martensite crystallographic phase 30 and thereby, for example, expand and lengthen the second segment 116 when the reset apparatus 20 is disposed in the reset state 26. Stated differently, the first resilient member 54 may reset the reset apparatus 20 to the reset state 26 more quickly than the shape memory alloy transitions to the martensite crystallographic phase 30 upon cooling. That is, the third duration 46 (FIG. 1) may be less than the second duration 44 (FIG. 1), as set forth above.

Referring to FIG. 7G, as the second segment 116 is cooled and the shape memory alloy continues to transition to the martensite crystallographic phase 30 (FIG. 1), the lobe 106 may abut one of the stops 112 as the second segment 116 continues to expand and/or lengthen, and may thereby reset the reset apparatus 20 from the reset state 26 to the initial state 22 over the fourth duration 48 (FIG. 1). When the reset apparatus 20 is disposed in the initial state 22, the shape memory alloy of the second segment 116 has the martensite crystallographic phase 30 (FIG. 1) and may then be ready to transition to the austenite crystallographic phase 32 (FIG. 1) upon application of heat 34 (FIG. 1) to the first segment 114. That is, the device 210 may then be ready for a subsequent actuation or activation cycle.

Referring now to FIGS. 8A-13, in another embodiment, the device 310, 410, 510, 610, 710, 810 may linearly translate to cycle the component 12 between the first condition 14 (FIG. 2) and the second condition 16 (FIG. 2). Further, as set forth in more detail below, for this embodiment, the reset apparatus 20 includes a driver component 118 having a first end 120 coupled to the element 28, and a second end 122 spaced apart from the first end 120. In addition, the reset apparatus 20 includes a follower component 124 releasably coupled to the driver component 118, and having a proximal end 102 and a distal end 82 spaced apart from the proximal end 102.

Referring now to FIGS. 8A-8C, in a fourth embodiment, the device 310 may have a force-based configuration and may be passively reset. For this embodiment, the device 310 may include a compliant joint or coupling, as set forth in more detail below. In particular, the device 310 may include a driver component 118 removably coupled to a follower component 124.

Referring to FIG. 8A, the driver component 118 may include a body 126 and two shoulders 128 extending from the body 126. The two shoulders 128 may be opposed from one another, and may extend from the body 126 at about a midpoint (not shown) of the body 126. Further, the driver component 118 may be removably coupled with the follower component 124. In addition, the first end 120 of the driver component 118 may be attached to the element 28, and the element 28 may be fixedly attached to an immovable object or portion 88 of the device 310, e.g., a wall. The second end 122 of the driver component 118 may be coupled to a second resilient member 86, e.g., a spring, which may also be attached to an immovable object or portion 88 of the device 310.

Referring now to FIGS. 8A-8C, the follower component 124 may include two arms 130 each spaced opposite and apart from one another. That is, the follower component 124 may have a U-shaped configuration. Each of the two arms 130 may have a protrusion 132 extending therefrom. The protrusion 132 may be configured for contacting a respective one of the two shoulders 128 to thereby releasably couple the driver component 118 and the follower component 124. That is, each protrusion 132 of the follower component 124 may be configured for mating with a respective shoulder 128 of the driver component 118. For example, one protrusion 132 may project from a distal end 82 of each arm 130. Further, the two arms 130 may be spaced opposite and apart from one another to define a cavity 134 therebetween.

In addition, with continued reference to FIGS. 8A-8C, a proximal end 102 of the follower component 124 may be attached to a first resilient member 54, e.g., a spring. The first resilient member 54 may be configured to act upon the component 12. For example, the component 12 may be a latch or a portion of a valve, and the first resilient member 54 may be configured to unlatch or open the component 12. In addition, the follower component 124 may abut a catch 136 when the reset apparatus 20 is in the initial state 22 (FIG. 3).

Referring to FIGS. 8A and 8B, in operation, as the element 28 is heated, the shape memory alloy may transition from the martensite crystallographic phase 30 (FIG. 8A) to the austenite crystallographic phase 32 (FIG. 8B) over the first duration 38 (FIG. 1) such that the element 28 contracts, e.g., shortens from the first length 40 (FIG. 8A) to the second length 42 (FIG. 8B), in the first direction 36. Such contraction of the element 28 may linearly translate the driver component 118 in the first direction 36 and elongate the second resilient member 86, which in turn may engage the two protrusions 132 with the two shoulders 128 to thereby couple and linearly translate the driver component 118 and the follower component 124 together in the first direction 36.

Referring to FIG. 8B, as both of the first resilient member 54 and the second resilient member 86 stretch and elongate, the follower component 124 may translate away from the catch 136 and actuate the reset apparatus 20 from the initial state 22 (FIG. 8A) to the actuated state 24 (FIG. 8B). In particular, the element 28 may shorten in the first direction 36 as the shape memory alloy transitions from the martensite crystallographic phase 30 to the austenite crystallographic phase 32 to couple the driver component 118 to the follower component 124, and translate the driver component 118 and the follower component 124 in the first direction 36, to thereby actuate the reset apparatus 20 from the initial state 22 to the actuated state 24, and thereby cycle the component 12 to the second condition 16. That is, the combined transition of the shape memory alloy to the austenite crystallographic phase 32 (FIG. 8B), and translation of the coupled driver component 118 and follower component 124 may elongate the first resilient member 54 and may thereby unlatch the component 12.

Referring to FIGS. 8B and 8C, as the element 28 continues to contract and/or shorten in the first direction 36, the protrusions 132 may ride over the two shoulders 128 to thereby pry apart the two arms 130 slightly so that the driver component 118 may escape and exit from the cavity 134 to thereby reset the reset apparatus 20 from the actuated state 24 (FIG. 8B) to the reset state 26 (FIG. 3) over the third duration 46 (FIG. 1). That is, the follower component 124 may translate in the second direction 52 so that each protrusion 132 may ride along and slide over a respective one of the two shoulders 128 to thereby reset the reset apparatus 20 from the actuated state 24 to the reset state 26, and thereby cycle the component 12 to the first condition 14. The first resilient member 54 may reset the reset apparatus 20 to the reset state 26 more quickly than the shape memory alloy transitions to the martensite crystallographic phase 30 upon cooling. That is, the third duration 46 (FIG. 1) may be less than the second duration 44 (FIG. 1), as set forth above.

Referring now to FIG. 8C, as the shape memory alloy continues to transition to the martensite crystallographic phase 30 (FIG. 8A), the second resilient member 86 may pull the driver component 118 and element 28 in the second direction 52 that is opposite the first direction 36, and may thereby reset the reset apparatus 20 from the reset state 26 to the initial state 22 over the fourth duration 48 (FIG. 1). That is, the driver component 118 may translate in the second direction 52 as the shape memory alloy transitions from the austenite crystallographic phase 32 to the martensite crystallographic phase 30 to thereby reset the reset apparatus 20 from the reset state 26 to the initial state 22. As such, the device 310 may then be ready for a subsequent actuation or activation cycle. For this embodiment, a shape of the shoulders 128 and protrusions 132, a coefficient of friction of the driver component 118 and/or the follower component 124, and/or a stiffness of the first resilient member 54 and the second resilient member 86 may be tailored to effect actuation and reset of the reset apparatus 20.

Referring now to FIGS. 9A-9C, in a fifth embodiment, the device 410 may have a control-based configuration and may be actively reset. For this embodiment, the device 410 may include a compliant joint or coupling, e.g., the driver component 118 and the follower component 124.

Referring to FIG. 9A, the driver component 118 may include a body 126 and two shoulders 128 extending from the body 126. The two shoulders 128 may be opposed from one another, and may extend from the body 126 at about a midpoint (not shown) of the body 126. The driver component 118 may be removably coupled with the follower component 124. In addition, the first end 120 of the driver component 118 may be attached to the element 28, and the element 28 may be fixedly attached to an immovable object or portion 88 of the device 410, e.g., a wall. The second end 122 of the driver component 118 may be coupled to a second resilient member 86, e.g., a spring, which may also be attached to an immovable object or portion 88 of the device 410.

With continued reference to FIGS. 9A-9C, the follower component 124 may include two arms 130 each spaced opposite and apart from one another. That is, the follower component 124 may have a U-shaped configuration. Each of the two arms 130 may have a protrusion 132 extending therefrom and configured for contacting a respective one of the two shoulders 128 to thereby releasably couple the driver component 118 and the follower component 124. That is, the each protrusion 132 of the follower component 124 may be configured for mating with a respective shoulder 128 of the driver component 118. For example, one protrusion 132 may project from a distal end 82 of each arm 130. Further, the two arms 130 may be spaced opposite and apart from one another to define a cavity 134 therebetween. In addition, with continued reference to FIGS. 9A-9C, a proximal end 102 of the follower component 124 may be attached to a first resilient member 54, e.g., a spring. The first resilient member 54 may be configured to act upon the component 12.

Further, as shown generally in FIGS. 9A-9C, the device 410 also may include a bimetallic strip 138 attached to the follower component 124 and configured for prying the two arms 130 apart from one another in response to a thermal stimulus 140 (FIG. 9C). For example, the bimetallic strip 138 may be disposed on each of the two arms 130. As used herein, the terminology "bimetallic strip" refers to a structure including at least two layers (not shown) formed from different metals which expand at different rates as the different metals are heated. The different metals may be, for example, steel and copper, or steel and brass. The at least two layers may be joined together by riveting, brazing, or welding. Since each metal has a different coefficient of thermal expansion, the differing coefficients may force a flattened bimetallic strip 138 to bend in one direction (not shown) if heated, and in an opposite direction (not shown) if cooled.

With continued reference to FIGS. 9A and 9B, in operation, heat 34 (FIG. 1) may be supplied to the element 28 according to a control signal or scheme (not shown). As the element 28 is heated, the shape memory alloy may transition from the martensite crystallographic phase 30 (FIG. 9A) to the austenite crystallographic phase 32 (FIG. 9B) over the first duration 38 (FIG. 1) such that the element 28 contracts, e.g., shortens from the first length 40 (FIG. 9A) to the second length 42 (FIG. 9B), in a first direction 36. Such contraction of the element 28 may linearly translate the driver component 118 in the first direction 36 and elongate the second resilient member 86, which in turn may engage the two shoulders 128 with the two protrusions 132 to thereby couple and linearly translate the driver component 118 and the follower component 124 together in the first direction 36.

Referring to FIG. 9B, as both of the first resilient member 54 and the second resilient member 86 stretch and elongate, the driver component 118 may translate away from the first resilient member 54 and actuate the reset apparatus 20 from the initial state 22 (FIG. 9A) to the actuated state 24 (FIG. 9B). That is, the combined transition of the shape memory alloy to the austenite crystallographic phase 32 (FIG. 9B), and translation of the coupled driver component 118 and follower component 124 may elongate the first resilient member 54 and may thereby unlatch the component 12.

Referring again to FIG. 9C, as the element 28 continues to contract and/or shorten in the first direction 36, heat 34 (FIG. 1) may be supplied to the bimetallic strip 138 to thereby pry apart the two arms 130 slightly so that the protrusions 132 may ride over the two shoulders 128, and the driver component 118 may escape and exit from the cavity 134 to thereby reset the reset apparatus 20 from the actuated state 24 to the reset state 26 (FIG. 3) over the third duration 46 (FIG. 1). The first resilient member 54 may reset the reset apparatus 20 to the reset state 26 more quickly than the shape memory alloy transitions to the martensite crystallographic phase 30 upon cooling. That is, the third duration 46 (FIG. 1) may be less than the second duration 44 (FIG. 1), as set forth above.

Referring to FIG. 9C, heat 34 (FIG. 1) may be removed from the element 28 according to a control signal or scheme (not shown). Therefore, as the shape memory alloy continues to transition to the martensite crystallographic phase 30 (FIG. 1), the second resilient member 86 may pull the driver component 118 and element 28 in the second direction 52 that is opposite the first direction 36 and may thereby reset the reset apparatus 20 from the reset state 26 to the initial state 22 (FIG. 9A) over the fourth duration 48 (FIG. 1). That is, the device 410 may then be ready for a subsequent actuation or activation cycle. For this embodiment, a shape of the shoulders 128 and protrusions 132, a coefficient of friction of the driver component 118 and/or the follower component 124, a deflection of the bimetallic strip 138, the electronic control signal or scheme (not shown), and/or a stiffness of the first resilient member 54 and the second resilient member 86 may be tailored to effect actuation and reset of the reset apparatus 20.

Referring now to FIGS. 10A-10C, in a sixth embodiment, the device 510 may have a control-based configuration and may be actively reset. For this embodiment, the device 510 may include the compliant joint or coupling, e.g., the driver component 118 and the follower component 124.

More specifically, referring to FIG. 10A, the driver component 118 may include a body 126 and two shoulders 128 extending from the body 126. The two shoulders 128 may be opposed from one another, and may extend from the body 126 at about a midpoint (not shown) of the body 126. The driver component 118 may be removably coupled with the follower component 124. In addition, the first end 120 of the driver component 118 may be attached to the element 28, and the element 28 may be fixedly attached to an immovable object or portion 88 of the device 510, e.g., a wall. The second end 122 of the driver component 118 may be coupled to a second resilient member 86, e.g., a spring, which may also be attached to an immovable object or portion 88 of the device 510.

With continued reference to FIGS. 10A-10C, the follower component 124 may include two arms 130 each spaced opposite and apart from one another. For example, the follower component 124 may have a U-shaped configuration. Each of the two arms 130 may have a protrusion 132 extending therefrom and configured for contacting a respective one of the two shoulders 128 to thereby releasably couple the driver component 118 and the follower component 124. That is, the each protrusion 132 of the follower component 124 may be configured for mating with a respective shoulder 128 of the driver component 118. For example, one protrusion 132 may project from a distal end 82 of each arm 130. Further, the two arms 130 may be spaced opposite and apart from one another to define a cavity 134 therebetween.

In addition, with continued reference to FIGS. 10A-10C, a proximal end 102 of the follower component 124 may be attached to a first resilient member 54, e.g., a spring. The first resilient member 54 may be configured to act upon the component 12.

Further, as shown generally in FIGS. 10A-10C, the device 510 may include a decoupling element 146 formed from the shape memory alloy and having a first section 142 coupled to a first of the two arms 130, and a second section 144 coupled to a second of the two arms 130. The first section 142 and the second section 144 may be configured for prying the two arms 130 apart from one another in response to the thermal stimulus 140 (FIG. 10C). As such, the first section 142 and the second section 144 may be coupled to the two arms 130 in any suitable manner. For example, the device 510 may include a frame configured for supporting and attaching the first and second sections 142, 144 to the two arms 130 of the follower component 124.

With continued reference to FIGS. 10A and 10B, in operation, heat 34 (FIG. 1) may be supplied to the element 28 and to the first and second sections 142, 144 according to a control signal or scheme (not shown). As the element 28 is heated, the shape memory alloy may transition from the martensite crystallographic phase 30 (FIG. 1) to the austenite crystallographic phase 32 (FIG. 1) over the first duration 38 (FIG. 1) such that the element 28 and the first and second sections 142, 144 contract, e.g., shorten. Such contraction of the element 28 may linearly translate the driver component 118 in the first direction 36 and may elongate the second resilient member 86, which may in turn engage the two shoulders 128 with the two protrusions 132 to thereby couple and linearly translate the driver component 118 and the follower component 124 together in the first direction 36.

Referring to FIG. 10B, as both of the first resilient member 54 and the second resilient member 86 stretch and elongate, the coupled driver component 118 and follower component 124 may translate away from the first resilient member 54 and actuate the reset apparatus 20 from the initial state 22 (FIG. 10A) to the actuated state 24 (FIG. 10B). That is, the combined transition of the shape memory alloy to the austenite crystallographic phase 32 (FIG. 1), and translation of the coupled driver component 118 and follower component 124 may elongate the first resilient member 54 and may thereby unlatch the component 12.

Referring again to FIG. 10C, as the element 28 continues to contract and/or shorten in the first direction 36, heat 34 (FIG. 1) may be supplied to the first and second sections 142, 144 to thereby pry apart the two arms 130 slightly so that the protrusions 132 may ride over the two shoulders 128 and the driver component 118 may escape and exit from the cavity 134 to thereby reset the reset apparatus 20 from the actuated state 24 to the reset state 26 over the third duration 46 (FIG. 1). The first resilient member 54 may reset the reset apparatus 20 to the reset state 26 more quickly than the shape memory alloy transitions to the martensite crystallographic phase 30 upon cooling. That is, the third duration 46 (FIG. 1) may be less than the second duration 44 (FIG. 1), as set forth above.

Referring to FIG. 10C, heat 34 (FIG. 1) may be removed from the element 28 and/or the first and second sections 142, 144 according to the control signal or scheme (not shown). Therefore, as the shape memory alloy continues to transition to the martensite crystallographic phase 30 (FIG. 1), the second resilient member 86 may pull the driver component 118 and element 28 in the second direction 52 that is opposite the first direction 36, and may thereby reset the reset apparatus 20 from the reset state 26 to the initial state 22 (FIG. 10C) over the fourth duration 48 (FIG. 1). That is, the device 510 may then be ready for a subsequent actuation or activation cycle. For this embodiment, a shape of the shoulders 128 and protrusions 132, a coefficient of friction of the driver component 118 and/or the follower component 124, a transformation temperature, $T_{trans}$, of the first and second sections 142, 144 and element 28, the control signal or scheme (not shown), and/or a stiffness of the first resilient member 54 and the second resilient member 86 may be tailored to effect actuation and reset of the reset apparatus 20.

Referring now to FIG. 11, in a seventh embodiment, the device 610 may have a control-based configuration and may be actively reset. For this embodiment, the follower component 124 may define the cavity 134 therein, and the driver component 118 may be translatable within the cavity 134.

More specifically, referring to FIG. 11, the driver component 118 may linearly translate into and out of the cavity 134. That is, the driver component 118 may be configured for linearly translating within the cavity 134 in the first direction 36 and the second direction 52 that is opposite the first direction 36. Moreover, the follower component 124 may be attached to a first resilient member 54, e.g., a spring. The first resilient member 54 may be configured to act upon the component (represented generally by 12).

With continued reference to FIG. 11, the driver component 118 may be formed as a plunger that is removably coupled to the follower component 124 within the cavity 134. The device 610 may further include at least one electromagnet 148 disposed at the second end 122 of the driver component 118. The at least one electromagnet 148 may be energizable in response to an electrical current 150 to thereby reversibly couple the driver component 118 and the follower component 124. Further, the follower component 124 may be formed from a ferrous material such that the at least one electromagnet 148 may be magnetically attracted to the follower component 124 when the at least one electromagnet 148 is energized. In addition, as shown in FIG. 11, the driver component 118 may be attached to the element 28, and the element 28 may be fixedly attached to an immovable object or portion 88 of the device 610 (FIG. 2), e.g., a wall.

With continued reference to FIG. 11, in operation, the electrical current 150 may be supplied to the at least one electromagnet 148 and the element 28. For example, electrical current 150 may be supplied over a time interval according to a specific current-time relationship (not shown). As such, as the element 28 may be heated by the electrical current 150, the shape memory alloy may transition from the martensite crystallographic phase 30 (FIG. 1) to the austenite crystallographic phase 32 (FIG. 1) over the first duration 38 (FIG. 1) such that the element 28 contracts, e.g., shortens from the first length 40 (FIG. 8A) to the second length 42 (FIG. 8B), in the first direction 36. Such contraction of the element 28 may linearly translate the driver component 118, coupled to the follower component 124 via the energized at least one electromagnet 148, in the first direction 36 and may elongate the first resilient member 54.

With continued reference to FIG. 11, as the driver component 118 and the follower component 124 both translate in the first direction 36, the coupled driver component 118 and follower component 124 may actuate the reset apparatus 20 from the initial state 22 (FIG. 3) to the actuated state 24 (FIG. 3). That is, the at least one electromagnet 148 may be energized and the follower component 124 may be coupled to the driver component 118. As such, the element 28 may shorten in the first direction 36 as the shape memory alloy transitions from the martensite crystallographic phase 30 to the austenite crystallographic phase 32 to translate the driver component 118 and the follower component 124 in the first direction 36, to thereby actuate the reset apparatus 20 from the initial state 22 to the actuated state 24, and thereby cycle the component 12 to the second condition 16 (FIG. 2). That is, the combined transition of the shape memory alloy to the austenite crystallographic phase 32 (FIG. 1), and translation of the coupled driver component 118 and follower component 124 may elongate the first resilient member 54 and may thereby unlatch the component 12.

Referring to FIG. 11, eventually, as both of the driver component 118 and the follower component 124 translate in the first direction 36, the force exerted by the first resilient member 54 may be greater than the force exerted by the magnetic attraction between the at least one electromagnet 148 and the follower component 124, and the driver component 118 may separate from the follower component 124 in the second direction 52. For example, the electrical current 150 may be removed from the at least one electromagnet 148 to ensure that the force exerted by the first resilient member 54 is greater than any remaining attraction between the at least one electromagnet 148 and the follower component 124.

Therefore, referring to FIG. 11, as the element 28 continues to contract and/or shorten in the first direction 36, and/or when electrical current 150 is removed from the at least one electromagnet 148 to thereby de-energize the at least one electromagnet 148, the driver component 118 may uncouple from the follower component 124, and the first resilient member 54 may rapidly translate the follower component 124 in the second direction 52 to thereby reset the reset apparatus 20 from the actuated state 24 (FIG. 1) to the reset state 26 (FIG. 1) over the third duration 46 (FIG. 1). That is, the at least one electromagnet 148 may be deenergized, and the follower component 124 may be uncoupled from the driver component 118. As such, the follower component 124 may translate in the second direction 52 to thereby reset the reset apparatus 20 from the actuated state 24 (FIG. 3) to the reset state 26 (FIG. 3), and thereby cycle the component 12 to the first condition 14. The first resilient member 54 may reset the reset apparatus 20 to the reset state 26 more quickly than the shape memory alloy transitions to the martensite crystallographic phase 30 upon cooling. That is, the third duration 46 (FIG. 1) may be less than the second duration 44 (FIG. 1), as set forth above.

Referring again to FIG. 11, as the shape memory alloy continues to transition to the martensite crystallographic phase 30 (FIG. 1), electrical current 150 may again be supplied to the at least one electromagnet 148 so that the at least one electromagnet 148 may pull the driver component 118 and element 28 in the second direction 52 according to magnetic attraction between the at least one electromagnet 148 and the follower component 124, and may thereby reset the reset apparatus 20 from the reset state 26 to the initial state 22 (FIG. 3) over the fourth duration 48 (FIG. 1). That is, the at least one electromagnet 148 may be energized, and the driver component 118 may translate in the second direction 52 as the shape memory alloy transitions from the austenite crystallographic phase 32 to the martensite crystallographic phase 30 to thereby reset the reset apparatus 20 from the reset state 26 to the initial state 22. As such, the device 610 may then be ready for a subsequent actuation or activation cycle.

Referring now to FIG. 12, in an eighth embodiment, the device 710 may have a force-based configuration and may be passively reset. For this embodiment, the device 710 may further include a first magnet 152 disposed at the second end 122 of the driver component 118, and a second magnet 154 releasably coupled to the first magnet 152 and disposed at the proximal end 102 of the follower component 124. That is, the first and second magnets 152, 154 may magnetically attract one another so as to releasably couple. For example, the first and second magnets 152, 154 may be permanent magnets. Further, for this embodiment, the follower component 124 may define a cavity 134 therein, and the driver component 118 may be translatable within the cavity 134.

Referring to FIG. 12, for this embodiment, the driver component 118 may linearly translate into and out of the cavity 134. That is, the driver component 118 may be configured for linearly translating within the cavity 134 in the first direction 36 and the second direction 52 that is opposite the first direction 36. Moreover, the follower component 124 may be attached to a first resilient member 54, e.g., a spring. The first resilient member 54 may be configured to act upon the component (represented generally by 12).

With continued reference to FIG. 12, the driver component 118 may be formed as a plunger that is removably coupled to the follower component 124 within the cavity 134. The first magnet 152 may be disposed at the second end 122 of the driver component 118, and the second magnet 154 may be disposed on the follower component 124. The first and second magnets 152, 154 may then reversibly couple the driver component 118 and the follower component 124. In addition, as shown in FIG. 12, the driver component 118 may be attached to the element 28, and the element 28 may be fixedly attached to an immovable object or portion 88 of the device 710 (FIG. 2), e.g., a wall.

With continued reference to FIG. 12, in operation, as the element 28 is heated, the shape memory alloy may transition from the martensite crystallographic phase 30 (FIG. 1) to the austenite crystallographic phase 32 (FIG. 1) over the first duration 38 (FIG. 1) such that the element 28 contracts, e.g., shortens from the first length 40 (FIG. 8A) to the second length 42 (FIG. 8B), in the first direction 36. Such contraction of the element 28 may linearly translate the driver component 118, coupled to the follower component 124 via the first and second magnets 152, 154, in the first direction 36 and may elongate the first resilient member 54.

Referring to FIG. 12, as the driver component 118 and the follower component 124 both translate in the first direction 36, the coupled driver component 118 and follower component 124 may actuate the reset apparatus 20 from the initial state 22 (FIG. 1) to the actuated state 24 (FIG. 1). That is, the first magnet 152 may be coupled to the second magnet 154 so that the follower component 124 is coupled to the driver component 118. The element 28 may shorten in the first direction 36 as the shape memory alloy transitions from the martensite crystallographic phase 30 to the austenite crystallographic phase 32 to translate the driver component 118 and the follower component 124 in the first direction 36, to thereby actuate the reset apparatus 20 from the initial state 22 (FIG. 3) to the actuated state 24 (FIG. 3), and thereby cycle the component 12 to the second condition 16. That is, the combined transition of the shape memory alloy to the austenite crystallographic phase 32 (FIG. 1), and translation of the coupled driver component 118 and follower component 124 may elongate the first resilient member 54 and may thereby unlatch the component 12.

Referring to FIG. 12, eventually, as both of the driver component 118 and the follower component 124 translate in the first direction 36, the force exerted by the first resilient member 54 may be greater than the force exerted by the magnetic attraction between the first and second magnets 152, 154, and the follower component 124 may separate from the driver component 118 in the second direction 52. That is, as the element 28 continues to contract and/or shorten in the first direction 36, the follower component 124 may uncouple from the driver component 118, and the first resilient member 54 may rapidly translate the follower component 124 in the second direction 52 to thereby reset the reset apparatus 20 from the actuated state 24 (FIG. 3) to the reset state 26 (FIG. 3) over the third duration 46 (FIG. 1). The follower component 124 may uncouple from the driver component 118, and the follower component 124 may translate in the second direction 52 to thereby reset the reset apparatus 20 from the actuated state 24 to the reset state 26, and thereby cycle the component to the first condition 14. The first resilient member 54 may reset the reset apparatus 20 to the reset state 26 more quickly than the shape memory alloy transitions to the martensite crystallographic phase 30 upon cooling. That is, the third duration 46 (FIG. 1) may be less than the second duration 44 (FIG. 1), as set forth above.

Referring again to FIG. 12, as the shape memory alloy continues to transition to the martensite crystallographic phase 30 (FIG. 1), the second magnet 154 may pull the driver component 118 and element 28 in the second direction 52 according to magnetic attraction between the first and second magnets 152, 154 and may thereby reset the reset apparatus 20 from the reset state 26 (FIG. 3) to the initial state 22 over the fourth duration 48 (FIG. 1). That is, the driver component 118 may translate in the second direction 52 as the shape memory alloy transitions from the austenite crystallographic phase 32 to the martensite crystallographic phase 30 to thereby reset the reset apparatus from the reset state 26 to the initial state 22. The device 710 may then be ready for a subsequent actuation or activation cycle. For this embodiment, properties of magnetic retention and repulsion may be tailored to enhance or shorten the third duration 46 (FIG. 1). For example, although not shown, the follower component 124 may define a helical guide groove to effect linear translation and rotation of the first magnet 152.

Figure 13:
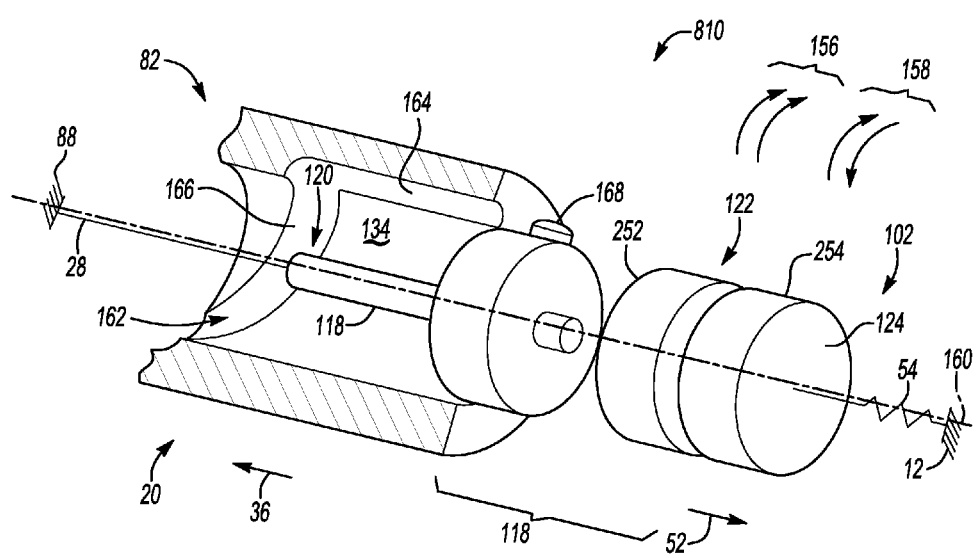
FIG. 13 is a schematic perspective exploded illustration of a cutaway side view of a ninth embodiment of the device of FIG. 1.

Referring now to FIG. 13, in a ninth embodiment, the device 810 may have a force-based configuration and may be passively reset. For this embodiment, the device 810 may include two magnets 252, 254. For example, the first magnet 252 and the second magnet 254 may be correlated magnets or coded magnets or force-matched magnets. As used herein, the terminology "correlated magnets" or "coded magnets" refers to an interaction of magnetic structures (not shown), each made up of geometric patterns of magnetic elements, i.e., maxels, imprinted into a magnet surface. These magnetic structures may feature designs of magnetic elements varying in polarity, field strength, size, shape, location, and dipole orientation. By varying the geometric patterns of the magnetic elements, the magnetic structures can be engineered to produce precision-tailored magnetic fields, forces, and behaviors. Such magnetic structures may interact with each other or with other ferrous metals, and can be created from any magnetic material, including rare-earth based magnets, ferrites, and ceramics. Suitable examples of correlated magnets are commercially available under the trade name Polymagnets™ from Correlated Magnetics Research of Huntsville, Ala.

As such, as shown generally in FIG. 13, the first magnet 252 and the second magnet 254 may each be configured for aligning in a first arrangement (generally represented by 156) so as to magnetically attract one another, and aligning in a second arrangement (generally represented by 158) so as to magnetically repulse one another. That is, the first and second magnets 252, 254 may magnetically attract one another so as to releasably couple. For this embodiment, the follower component 124 may define a cavity 134 therein and may have a central longitudinal axis 160, and the driver component 118 may be translatable within the cavity 134 along the central longitudinal axis 160. Further, one of the first and second magnets 252, 254 may be disposed within the cavity 134.

More specifically, referring to FIG. 13, the follower component 124 may further define a channel 162 therein having a linear portion 164 configured to effect linear translation of the driver component 118, and a non-linear portion 166 configured to effect rotational translation of the driver component 118. That is, the linear portion 164 and non-linear portion 166 may be interconnected so that the channel 162 may have a generally helical shape. As such, the linear portion 164 of the channel 162 may be configured for linearly translating the driver component 118 within the cavity 134 along the central longitudinal axis 160 without rotation of the driver component 118, and the non-linear portion 166 of the channel 162 may be configured for linearly and rotationally translating the driver component 118 within the cavity 134 along the central longitudinal axis 160.

In addition, with continued reference to FIG. 13, the driver component 118 may further include a guide post 168 configured for translating within the channel 162. That is, the guide post 168 may protrude from the driver component 118, and may be disposed in and mate with the channel 162. The guide post 168 may guide the driver component 118 along the channel 162 so that the driver component 118 may translate linearly along the linear portion 164, and may both linearly and rotationally translate along the non-linear portion 166 within the cavity 134.

Referring to FIG. 13, the device 810 may also include the element 28 attached to the driver component 118, and the element 28 may be fixedly attached to an immovable object or portion 88 of the device 810 (FIG. 2), e.g., a wall. The driver component 118 may also be attached to the first magnet 252. Further, the second magnet 254 may be attached to a first resilient member 54, e.g., a spring, and the first resilient member 54 may be configured to act upon the component (represented generally by 12).

With continued reference to FIG. 13, in operation, as the element 28 is heated, the shape memory alloy may transition from the martensite crystallographic phase 30 (FIG. 1) to the austenite crystallographic phase 32 (FIG. 1) over the first duration 38 (FIG. 1) such that the element 28 contracts, e.g., shortens from the first length 40 (FIG. 8A) to the second length 42 (FIG. 8B), in the first direction 36. Such contraction of the element 28 may linearly translate the driver component 118 and the first magnet 252 in the first direction 36 along the linear portion 164 of the channel 162, and may elongate the first resilient member 54. Further, eventually, as the element 28 continues to contract and/or shorten, the guide post 168 may continue to translate within the channel 162, and the driver component 118 may translate both linearly and rotationally within the non-linear portion 166 of the channel 162.

Referring again to FIG. 13, the initial linear translation of the driver component 118 and the follower component 124 may move both the first and second magnets 252, 254 in the first direction 36 and may actuate the reset apparatus 20 from the initial state 22 (FIG. 3) to the actuated state 24 (FIG. 3). That is, the first magnet 252 may be coupled to the second magnet 254 so that the follower component 124 is coupled to the driver component 118. Further, the element 28 may shorten in the first direction 36 as the shape memory alloy transitions from the martensite crystallographic phase 30 to the austenite crystallographic phase 32 to translate the driver component 118 and the follower component 124 in the first direction 36 as the guide post 168 translates along the linear portion 164 to thereby actuate the reset apparatus 20 from the initial state 22 (FIG. 3) to the actuated state 24 (FIG. 3), and thereby cycle the component 12 to the second condition 16. That is, the combined transition of the shape memory alloy to the austenite crystallographic phase 32 (FIG. 1), and linear translation of the driver component 118 and the follower component 124 may elongate the first resilient member 54 and may thereby unlatch the component 12.

With continued reference to FIG. 13, the subsequent rotational translation of the driver component 118 may cause the first magnet 252 to unalign with respect to the second magnet 254 so that the two correlated magnets 252, 254 uncouple. Then, the driver component 118 may separate from the second magnet 154 as the element 28 continues to contract and/or shorten in the first direction 36. That is, the driver component 118 may uncouple from the second magnet 254, and the first resilient member 54 may rapidly translate the second magnet 154 in the second direction 52 to thereby reset the reset apparatus 20 from the actuated state 24 (FIG. 3) to the reset state 26 (FIG. 3) over the third duration 46 (FIG. 1).

That is, with continued reference to FIG. 13, the follower component 124 may be uncoupled from the driver component 118 as the guide post 168 translates along the non-linear portion 166 of the channel 162. As such, the follower component 124 may translate in the second direction 52 to thereby reset the reset apparatus 20 from the actuated state 24 to the reset state 26, and thereby cycle the component 12 to the first condition 14. The first resilient member 54 may reset the reset apparatus 20 to the reset state 26 more quickly than the shape memory alloy transitions to the martensite crystallographic phase 30 upon cooling. That is, the third duration 46 (FIG. 1) may be less than the second duration 44 (FIG. 1), as set forth above.

Referring again to FIG. 13, as the shape memory alloy continues to transition to the martensite crystallographic phase 30 (FIG. 1), the second magnet 154 may pull the driver component 118 and element 28 in the second direction 52 according to magnetic attraction between the first and second magnets 252, 254 and may thereby reset the reset apparatus 20 from the reset state 26 (FIG. 1) to the initial state 22 (FIG. 1) over the fourth duration 48 (FIG. 1). That is, the driver component 118 may translate in the second direction 52 as the shape memory alloy transitions from the austenite crystallographic phase 32 (FIG. 1) to the martensite crystallographic phase 30 to thereby reset the reset apparatus 20 from the reset state 26 to the initial state 22. That is, the device 810 may then be ready for a subsequent actuation or activation cycle. For this embodiment, properties of magnetic retention and repulsion for correlated magnets may be tailored to enhance or shorten the third duration 46 (FIG. 1).

Accordingly, the aforementioned embodiments of the device 10 are quickly resettable or de-actuatable and minimize or eliminate unnecessary ambient cooling of the shape memory alloy. That is, the devices 10 may be immediately relatched or closed before the shape memory alloy has completely cooled. As such, the devices 10 minimize the third duration 46 (FIG. 1), and exhibit an excellent cycle time between the actuated state 24 (FIG. 3) and the initial state 22 (FIG. 3). Stated differently, the devices 10 allow for substantially immediate de-actuation of the reset apparatus 20 without waiting for the shape memory alloy to transition to the martensite crystallographic phase 30 (FIG. 1), i.e., without waiting for the shape memory alloy to cool. Further, the devices 10 are reliable, lightweight, and are economical. In addition, the devices 10 facilitate priming, healing, and maintenance of the shape memory alloy since the shape memory alloy is able to recover during the reset state 26.

While the best modes for carrying out the disclosure have been described in detail, those familiar with the art to which this disclosure relates will recognize various alternative designs and embodiments for practicing the disclosure within the scope of the appended claims.

The invention claimed is:

1. A device for cycling a component between a first condition and a second condition, the device comprising:
   an element formed from a shape memory alloy, wherein the shape memory alloy is transitionable between a martensite crystallographic phase and an austenite crystallographic phase in response to a source of thermal energy; and
      wherein the shape memory alloy is transitionable from the martensite crystallographic phase to the austenite crystallographic phase over a first duration, and further wherein the shape memory alloy is transitionable from the austenite crystallographic phase to the martensite crystallographic phase over a second duration that is longer than the first duration; and
   a reset apparatus connected to and driven by the element, the reset apparatus including:
      a link; and
      a disc operatively connected to the link;
      wherein the reset apparatus is actuatable by the element from an initial state in which the shape memory alloy has the martensite crystallographic phase and the component is in the first condition, to an actuated state in which the shape memory alloy has the austenite crystallographic phase and the component is in the second condition;
      wherein the reset apparatus is resettable from the actuated state to a reset state in which the shape memory alloy transitions from the austenite crystallographic phase to the martensite crystallographic phase while the component is in the first condition, and is further resettable from the reset state to the initial state; and
      wherein the reset apparatus is resettable from the actuated state to the reset state over a third duration that is less than the second duration, and is further resettable from the reset state to the initial state over a fourth duration which is equal to a difference between the second duration and the third duration.

2. The device of claim 1, wherein the first duration is equal to the third duration.

3. The device of claim 1, wherein the third duration is from about 0.5 seconds to about 2 seconds.

4. The device of claim 1, wherein the reset apparatus is not actuatable from the initial state to the actuated state when the reset apparatus is in the reset state.

5. The device of claim 1, wherein the device does not cycle the component to the second condition while the reset apparatus is in the reset state.

6. The device of claim 1, wherein the element contracts as the shape memory alloy transitions from the martensite crystallographic phase to the austenite crystallographic phase, and expands as the shape memory alloy transitions from the austenite crystallographic phase to the martensite crystallographic phase.

7. The device of claim 6, wherein the element shortens as the shape memory alloy transitions from the martensite crystallographic phase to the austenite crystallographic phase to thereby actuate the reset apparatus from the initial state to the actuated state, and lengthens as the shape memory alloy transitions from the austenite crystallographic phase to the martensite crystallographic phase as the reset apparatus resets from the actuated state to the reset state.

8. A device for cycling a component between a first condition and a second condition, the device comprising:
an element formed from a shape memory alloy and contractable in a first direction, wherein the shape memory alloy is transitionable between a martensite crystallographic phase and an austenite crystallographic phase in response to a source of thermal energy;
a reset apparatus connected to and driven by the element, the reset apparatus including:
a link translatable in a second direction that is opposite the first direction to thereby cycle the component to the second condition; and
a disc rotatable about an axis of rotation and operatively connected to the link;
wherein the reset apparatus is actuatable by the element from an initial state in which the shape memory alloy has the martensite crystallographic phase and the component is in the first condition, to an actuated state in which the shape memory alloy has the austenite crystallographic phase and the component is in the second condition;
wherein the reset apparatus is resettable from the actuated state to a reset state in which the shape memory alloy transitions from the austenite crystallographic phase to the martensite crystallographic phase while the component is in the first condition; and
wherein the reset apparatus is further resettable from the reset state to the initial state;
a cam connected to the link and defining a groove therein;
wherein the cam includes a horizontal wall, a vertical wall, and a curvilinear wall interconnecting the vertical wall and the horizontal wall, wherein the horizontal wall defines a horizontal portion of the groove, the vertical wall defines a vertical portion of the groove, and the curvilinear wall defines a curvilinear portion of the groove; and
an arm extending from the disc and having a distal end, wherein the arm includes a pin protruding from the distal end and configured for translating within the groove.

9. The device of claim 8, wherein the first direction is perpendicular to the axis of rotation.

10. The device of claim 8, wherein the element shortens in the first direction as the shape memory alloy transitions from the martensite crystallographic phase to the austenite crystallographic phase to thereby rotate the disc about the axis of rotation.

11. The device of claim 8, wherein the cam and the link translate in the second direction as the pin abuts the vertical wall to thereby actuate the reset apparatus from the initial state to the actuated state, and thereby cycle the component to the second condition.

12. The device of claim 8, wherein the cam and the link translate in the first direction as the pin abuts the horizontal wall to thereby reset the reset apparatus from the actuated state to the reset state, and thereby cycle the component to the first condition.

13. The device of claim 8, wherein the cam and the link translate in the first direction as the pin abuts the curvilinear wall to thereby reset the reset apparatus from the reset state to the initial state.

14. The device of claim 8, further including a gate flap pivotable about an axis and configured for alternatingly blocking and unblocking the groove.

* * * * *